US012235976B2

(12) United States Patent
Pantazelos

(10) Patent No.: US 12,235,976 B2
(45) Date of Patent: Feb. 25, 2025

(54) AUTHENTICATED AND AUTHORIZED TRANSFER OF CONTENT OVER A COMMUNICATION NETWORK

(71) Applicant: FYFO LLC, Park City, UT (US)

(72) Inventor: George Pantazelos, Park City, UT (US)

(73) Assignee: FYFO LLC, Park City, UT (US)

( * ) Notice: Subject to any disclaimer, the term of this patent is extended or adjusted under 35 U.S.C. 154(b) by 287 days.

(21) Appl. No.: 17/649,135

(22) Filed: Jan. 27, 2022

(65) Prior Publication Data

US 2022/0366063 A1    Nov. 17, 2022

Related U.S. Application Data

(60) Provisional application No. 63/187,678, filed on May 12, 2021.

(51) Int. Cl.
| | |
|---|---|
| *G06F 21/62* | (2013.01) |
| *G06V 40/16* | (2022.01) |
| *H04L 9/40* | (2022.01) |
| *H04L 65/75* | (2022.01) |
| *H04L 67/1095* | (2022.01) |

(52) U.S. Cl.
CPC ........ *G06F 21/6209* (2013.01); *G06V 40/172* (2022.01); *H04L 63/0861* (2013.01); *H04L 65/75* (2022.05); *H04L 67/1095* (2013.01)

(58) Field of Classification Search
CPC .. G06F 21/6209; G06F 21/6245; G06F 21/10; G06V 40/172; H04L 63/0861; H04L 65/75; H04L 67/1095; H04L 9/50; H04L 63/10; H04W 12/06; H04W 12/08

USPC .......................................................... 726/7
See application file for complete search history.

(56) References Cited

U.S. PATENT DOCUMENTS

| | | | |
|---|---|---|---|
| 6,055,315 | A | 4/2000 | Doyle et al. |
| 7,143,290 | B1 | 11/2006 | Ginter et al. |
| 7,356,510 | B2 | 4/2008 | Durand et al. |
| 7,356,848 | B1 | 4/2008 | Duffield et al. |
| 7,991,388 | B1 | 8/2011 | Becker et al. |
| 8,131,865 | B2 | 3/2012 | Rebaud et al. |
| 8,307,029 | B2 | 11/2012 | Davis et al. |
| 8,428,453 | B1 | 4/2013 | Spiegel et al. |
| 8,489,887 | B1 | 7/2013 | Newman et al. |
| 8,799,371 | B2 | 8/2014 | Davis et al. |
| 8,949,347 | B2 | 2/2015 | Errico et al. |
| 8,966,643 | B2 | 2/2015 | Chen et al. |
| 9,118,809 | B2 | 8/2015 | Anderson et al. |
| 9,131,339 | B1 | 9/2015 | Kulfan et al. |

(Continued)

OTHER PUBLICATIONS

B. Gallagher, "A Tale of Two Patents: Why Facebook Can't Clone Snapchat", https://techcrunch.com/2014/06/22/facebook-slingshot-snapchat-patents/, Jun. 22, 2014, pp. 1-10, AOL Inc.

(Continued)

*Primary Examiner* — Tan Doan
(74) *Attorney, Agent, or Firm* — Intrinsic Law Corp.

(57) ABSTRACT

A system and method are provided for conditional delivery of electronic content from a sender to a recipient. The content may be secured and authenticated so as to control the delivery only to intended recipients, e.g., using an authorizing entity to grant permission for such delivery, and in some instances using blockchain to control the transfer of the rights in the content.

26 Claims, 14 Drawing Sheets

(56) References Cited

U.S. PATENT DOCUMENTS

| | | |
|---|---|---|
| 9,143,681 B1 | 9/2015 | Ebsen et al. |
| 9,282,284 B2 | 3/2016 | Kajarekar et al. |
| 9,626,493 B2 | 4/2017 | Cohen |
| 9,633,186 B2 | 4/2017 | Ingrassia et al. |
| 9,891,803 B2 | 2/2018 | Scott et al. |
| 10,298,547 B2 | 5/2019 | Ziebell |
| 2005/0283401 A1* | 12/2005 | Swix .................. G06Q 30/0224 705/14.25 |
| 2006/0041755 A1 | 2/2006 | Pemmaraju |
| 2006/0259755 A1 | 11/2006 | Kenoyer |
| 2009/0150489 A1 | 6/2009 | Davis et al. |
| 2009/0317060 A1 | 12/2009 | Han et al. |
| 2011/0067098 A1 | 3/2011 | Nelson et al. |
| 2011/0093942 A1 | 4/2011 | Koster et al. |
| 2012/0066705 A1 | 3/2012 | Harada et al. |
| 2012/0216293 A1 | 8/2012 | Rebaud et al. |
| 2013/0036458 A1 | 2/2013 | Liberman et al. |
| 2013/0109349 A1 | 5/2013 | Iyengar |
| 2013/0179911 A1 | 7/2013 | Dang et al. |
| 2013/0219459 A1 | 8/2013 | Bradley |
| 2013/0305158 A1 | 11/2013 | Vasquez et al. |
| 2014/0047413 A1 | 2/2014 | Sheive et al. |
| 2014/0049653 A1 | 2/2014 | Leonard et al. |
| 2014/0096167 A1* | 4/2014 | Lang .................. H04N 21/4788 725/91 |
| 2014/0115179 A1 | 4/2014 | Rebaud et al. |
| 2014/0123260 A1 | 5/2014 | Choi et al. |
| 2014/0129953 A1 | 5/2014 | Spiegel |
| 2014/0149888 A1 | 5/2014 | Morris |
| 2014/0150072 A1 | 5/2014 | Castro et al. |
| 2014/0229544 A1 | 8/2014 | Evans et al. |
| 2014/0341444 A1 | 11/2014 | Hou et al. |
| 2015/0095352 A1 | 4/2015 | Lacey |
| 2015/0097922 A1 | 4/2015 | Le Devehat et al. |
| 2015/0381575 A1 | 12/2015 | Bhargav-Spantzel et al. |
| 2016/0007171 A1 | 1/2016 | Geller et al. |
| 2016/0063235 A1 | 3/2016 | Tussy |
| 2016/0112428 A1 | 4/2016 | Terleski et al. |
| 2016/0188958 A1 | 6/2016 | Martin |
| 2016/0234551 A1 | 8/2016 | Allegretti et al. |
| 2016/0366203 A1 | 12/2016 | Blong et al. |
| 2017/0063852 A1 | 3/2017 | Azar et al. |
| 2017/0075561 A1 | 3/2017 | Ghazanfari |
| 2017/0208362 A1 | 7/2017 | Flores et al. |
| 2017/0220578 A1 | 8/2017 | Kazi et al. |
| 2017/0228600 A1 | 8/2017 | Syed et al. |
| 2017/0251366 A1 | 8/2017 | Perna et al. |
| 2017/0374074 A1 | 12/2017 | Stuntebeck |
| 2018/0083978 A1* | 3/2018 | Pantazelos ............ H04W 12/06 |
| 2018/0332318 A1 | 11/2018 | Nagy et al. |
| 2020/0193068 A1 | 6/2020 | Jones |

OTHER PUBLICATIONS

J. Constine, "Facebook's Slingshot Challenges Snapchat With 'Reply To Unlock'", https://techcrunch.com/2014/06/17/facebook-slingshot/, Jun. 17, 2014, pp. 1-2, AOL Inc.

G. Sloane, "This Small Startup Says Facebook Imitated Its Photo App Idea", http://www.adweek.com/news/technology/small-startup-says-facebook-imitated-its-photo-app-idea-158425, Jun. 18, 2014, p. 1-1, Adweek.

International Search Report for PCT/US2022/072198, dated Aug. 4, 2022.

* cited by examiner

AUTHENTICATED AND AUTHORIZED TRANSFER OF CONTENT OVER A COMMUNICATION NETWORK

CROSS-REFERENCE TO RELATED APPLICATIONS

This application claims priority to U.S. Provisional Application No. 63/187,678, titled "Authenticated and Authorized Transfer of Content Over a Communication Network," filed on May 12, 2021, which is hereby incorporated by reference.

TECHNICAL FIELD

This application relates generally to the delivery of digital media over a communication network including authentication for delivery and authorization for transfer of temporary or permanent rights therein.

BACKGROUND

Computer programs and devices have been developed for exchanging electronic files over a communication network. Upon the introduction of mobile computing platforms and so-called smart phones and similar portable communication devices, such programs and applications were extended to run on these mobile devices. Today, millions of wireless and mobile communication devices have installed apps for sending and receiving image files such as digital photographs, video segments or similar content. Messaging and social media apps such as Facetime, Snapchat, ooVoo, and many others allow a user to take an image, e.g., a digital photograph, or video clip and send the image to a friend or group of contacts reachable over a communication network (e.g., cellular network, WiFi).

Most such photo sharing applications allow the sender or owner of an image to control the delivery of the image insofar as the one or more recipients of the image. For example, a user can take a digital photograph using a camera-equipped smartphone, then select from his or her contacts list one or more friends or contacts to which the image is to be delivered, or who will receive a notification and access to view the image. The notifications are usually delivered to the recipients as short messages or notification alerts that pop up on the recipients' devices, or by way of a message, email or similar notification sent to an address or telephone number associated with the intended contacts.

Delivery of images, videos and similar content over mobile communication device networks generally assumes that an owner or user of a device is the only authorized user of the device. Therefore, a message sent to a recipient from a sender's contacts list is in fact sent to the device associated with that recipient, e.g., the recipient's telephone number, email address, network address, etc. So, if an intended recipient leaves his or her device accessible to others, anyone with access to the device could inadvertently view the content sent to the device. Similarly, if more than one person owns a device (e.g., a husband and wife, siblings, coworkers) it is not possible to control which human user will be the one to open and review the delivered content. This issue applies to content delivery in general, absent a personal login or authentication code, not just images, but we can use the example of image delivery to illustrate the present concepts.

The present inventor has described various methods of authentication for delivery or streaming of content between parties, e.g., in Provisional Application No. 62/397,579, filed on Sep. 21, 2016, entitled "Conditional Delivery of Digital Content Over a Communication Network"; Provisional Application No. 62/523,453, filed on Jun. 22, 2017, entitled "Conditional Delivery of Content Over a Communication Network Including Social Sharing Application Using Facial Recognition"; and Provisional Application No. 62/535,346, filed on Jul. 21, 2017, entitled "Conditional Delivery of Digital Content Over a Communication Network Including Social Sharing and Video Conference Applications Using Facial Recognition", some or all of which are now U.S. Pat. No. 10,931,676, and all of which are hereby incorporated by reference.

As can be appreciated, an issue can arise if the sender of the image considers the content of the image to be of sensitive or very personal nature and needs to know that the actual human recipient to whom the image is sent is in fact the person viewing the delivered image or confidential content. Also, there is a need to improve real time response delivery so that a sender knows what response, if any, the recipient had to the sent content. Current systems allow a response from a recipient to be delivered to the sender acknowledging received content, but the response is generated after the fact and not in real time, so that the recipient's response lacks the spontaneity that may be desired or amusing to the sender of the content. In addition, current systems lack sufficient identity verification with respect to verifying the identity of a participant in a remote electronic meeting session.

Current systems have significant limitations in controlling the rights in digital media or controlling the transfer of ownership thereof, as well as limitations in authenticating or authorizing the movement and delivery of digital media from a sender to a recipient.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

One or more embodiments are directed to a computer-implemented method for securely delivering content over a communications network, the method comprising receiving a request, from a requestor computing device associated with a requestor, for a creator to react to an original media content provided by the requestor, the request including one or more privacy conditions under which a third-party recipient and the requestor will be allowed to view a reaction to the original media content; sending a notification of the request to a creator computing device associated with the creator; receiving, from the creator computing device, an agreement to the privacy condition(s); facially authenticating the creator's identity by receiving, from the creator computing device, real-time creator video data of the creator's face; determining whether the creator's face in the real-time creator video data has at least a threshold facial recognition match to one or more pre-stored creator images that include the creator's face and/or one or more pre-stored creator videos that include the creator's face; and determining that the creator's identity is authentic when the creator's face in the real-time creator video data has at least the threshold facial recognition match to the pre-stored creator image(s) and/or to the pre-stored creator video(s); after facially authenticating the creator's identity, sending the request and the original media content to the creator computing device to allow the creator to review the request and the original media content; after sending the request and the original media content to the creator computing device, receiving, from the creator computing device, an agreement to the request; receiving, from the creator computing device, a reaction media content that represents the creator's reaction to the original media content; combining the reaction media content and the original media content into a synchronized file in which the reaction media content is time-synchronized with the original media content; sending, to the creator computing device, the synchronized file for review; receiving, from the creator computing device, a creator's approval of the synchronized file; after receiving the creator's approval of the synchronized file, automatically sending a notification to an approver computing device associated with an approver, the approver having a predetermined relationship with the creator, the notification indicating an availability of the synchronized file for review; receiving, from the approver computing device, a request to review the synchronized file; facially authenticating the approver's identity by receiving, from the approver computing device, real-time approver video data of the approver's face; determining whether the approver's face in the real-time approver video data has at least the threshold facial recognition match to one or more pre-stored approver images that include the approver's face and/or one or more pre-stored approver videos that include the approver's face; and determining that the approver's identity is authentic when the approver's face in the real-time approver video data has at least the threshold facial recognition match to the pre-stored approver image(s) and/or to the pre-stored approver video(s); after facially authenticating the approver's identity, sending the synchronized file to the approver computing device to allow the approver to review the synchronized file; after sending the synchronized file to the approver computing device, receiving, from the approver computing device, an approver's approval of the synchronized file; after receiving the approver's approval of the synchronized file, sending a notification to the requestor computing device, the notification indicating an availability of the synchronized file for review; facially authenticating the requestor's identity by receiving, from the requestor computing device, real-time requestor video data of the requestor's face; determining whether the requestor's face in the real-time requestor video data has at least the threshold facial recognition match to one or more pre-stored requestor images that include the requestor's face and/or one or more pre-stored requestor videos that include the requestor's face; and determining that the requestor's identity is authentic when the requestor's face in the real-time requestor video data has at least the threshold facial recognition match to the pre-stored requestor image(s) and/or to the pre-stored requestor video(s); after facially authenticating the requestor's identity, sending the synchronized file to the requestor computing device to allow the requestor to review the synchronized file; after sending the synchronized file to the requestor computing device, receiving, from the approver computing device, a creator's approval of the synchronized file; after receiving the creator's approval of the synchronized file, sending a notification to a recipient computing device associated with the recipient, the notification indicating an availability of the synchronized file to view; and restricting a viewing of the synchronized file by the recipient to the privacy condition(s).

One or more embodiments are directed to at least one server, each server comprising a microprocessor; computer memory operatively coupled to the microprocessor, the computer memory including computer-readable instructions that when executed by the microprocessor cause the microprocessor to receive a request, from a requestor computing device associated with a requestor, for a creator to react to an original media content provided by the requestor, the request including one or more privacy conditions under which a third-party recipient will be allowed to view the media content; send a notification of the request to a creator computing device associated with the creator; receive, from the creator computing device, an agreement to the privacy condition(s); facially authenticate the creator's identity by receiving, from the creator computing device, real-time creator video data of the creator's face; determining whether the creator's face in the real-time creator video data has at least a threshold facial recognition match to one or more pre-stored creator images that include the creator's face and/or one or more pre-stored creator videos that include the creator's face; and determining that the creator's identity is authentic when the creator's face in the real-time creator video data has at least the threshold facial recognition match to the pre-stored creator image(s) and/or to the pre-stored creator video(s); after facially authenticating the creator's identity, send the request and the original media content to the creator computing device to allow the creator to review the request and the original media content; after sending the request and the original media content to the creator computing device, receive, from the creator computing device, an agreement to the request; receive, from the creator computing device, a reaction media content that represents the creator's reaction to the original media content; combine the reaction media content and the original media content into a synchronized file in which the reaction media content is time-synchronized with the original media content; send, to the creator computing device, the synchronized file for review; receive, from the creator computing device, a creator's approval of the synchronized file; after receiving the approval of the synchronized file, automatically send a notification to an approver computing device associated with an approver, the approver having a predetermined relationship with the creator, the notification indicating an availability of the synchronized file for review; receive, from the approver computing device, a request to review the synchronized file; facially authenticate the approver's identity by receiving, from the approver computing device, real-time approver video data of the approver's face; determining whether the approver's face in the real-time approver video data has at least the threshold facial recognition match to one or more pre-stored approver images that include the approver's face and/or one or more pre-stored approver videos that include the approver's face; and determining that the approver's identity is authentic when the approver's face in the real-time approver video data has at least the threshold facial recognition match to the pre-stored approver image(s) and/or to the pre-stored approver video(s); after facially authenticating the approver's identity, send the synchronized file to the approver computing device to allow the approver to review the synchronized file; after sending the synchronized file to the approver computing device, receive, from the approver computing device, an approver's approval of the synchronized file; after receiving the approver's approval of the synchronized file, send a notification to the requestor computing device, the notification indicating an availability of the synchronized file for review; authenticate the requestor's identity by receiving, from the requestor computing device, real-time requestor video data of the requestor's face; determining whether the requestor's face in the real-time requestor video data has at least the threshold facial recognition match to one or more pre-stored requestor images that include the requestor's face and/or one or more pre-stored requestor videos that include the requestor's face; and determining that the requestor's identity is authentic when the requestor's face in the real-time requestor video data has at least the threshold facial recognition match to the pre-stored requestor image(s) and/or to the pre-stored requestor video(s); after facially authenticating the requestor's identity, send the synchronized file to the requestor computing device to allow the requestor to review the synchronized file; after sending the synchronized file to the requestor computing device, receive, from the approver computing device, a creator's approval of the synchronized file; after receiving the creator's approval of the synchronized file, send a notification to a recipient computing device associated with the recipient, the notification indicating an availability of the synchronized file to view; and restrict a viewing of the synchronized file by the recipient to the privacy condition(s).

One or more embodiments are directed to a computer-implemented method for securely delivering content over a communications network, the method comprising receiving a request, from a requestor computing device associated with a requestor, for a creator to create an original video, the request including one or more privacy conditions under which a third-party recipient and the requestor will be allowed to view the original video; sending a notification of the request to a creator computing device associated with the creator; receiving, from the creator computing device, an agreement to the privacy condition(s); facially authenticating the creator's identity by receiving, from the creator computing device, real-time creator video data of the creator's face; determining whether the creator's face in the real-time creator video data has at least a threshold facial recognition match to one or more pre-stored creator images that include the creator's face and/or one or more pre-stored creator videos that include the creator's face; and determining that the creator's identity is authentic when the creator's face in the real-time creator video data has at least the threshold facial recognition match to the pre-stored creator image(s) and/or to the pre-stored creator video(s); after facially authenticating the creator's identity, sending the request to the creator computing device to allow the creator to review the request; after sending the request to the creator computing device, receiving, from the creator computing device, an agreement to the request; receiving the original video; sending, to the creator computing device, the original video for review; receiving, from the creator computing device, a creator's approval of the original video; after receiving the creator's approval of the original video, automatically sending a notification to an approver computing device associated with an approver, the approver having a predetermined relationship with the creator, the notification indicating an availability of the original video for review; receiving, from the approver computing device, a request to review the original video; facially authenticating the approver's identity by receiving, from the approver computing device, real-time approver video data of the approver's face; determining whether the approver's face in the real-time approver video data has at least the threshold facial recognition match to one or more pre-stored approver images that include the approver's face and/or one or more pre-stored approver videos that include the approver's face; and determining that the approver's identity is authentic when the approver's face in the real-time approver video data has at least the threshold facial recognition match to the pre-stored approver image(s) and/or to the pre-stored approver video (s); after facially authenticating the approver's identity, sending the original video to the approver computing device to allow the approver to review the original video; after sending the original video to the approver computing device, receiving, from the approver computing device, an approver's approval of the original video; after receiving the approver's approval of the original video, sending a notification to a recipient computing device associated with the recipient, the notification indicating an availability of the original video for viewing; facially authenticating the recipient's identity by receiving, from the recipient computing device, real-time recipient video data of the recipient's face; determining whether the recipient's face in the real-time recipient video data has at least the threshold facial recognition match to one or more pre-stored recipient images that include the recipient's face and/or one or more pre-stored recipient videos that include the recipient's face; and determining that the recipient's identity is authentic when the recipient's face in the real-time recipient video data has at least the threshold facial recognition match to the pre-stored recipient image(s) and/or to the pre-stored recipient video (s); after facially authenticating the recipient's identity, sending the original video to the recipient computing device to allow the recipient to view the original video; receiving a reaction video, from the recipient computing device, of the recipient viewing the original video; combining the reaction video and the original video into a synchronized video in which the reaction video is time-synchronized with the original video; sending a notification to the requestor computing device, the notification indicating an availability of the synchronized video to view; facially authenticating the requestor's identity; and after facially authenticating the requestor's identity, sending the original video and the synchronized video to the requestor computing device to allow the requestor to view the original video and the synchronized video.

BRIEF DESCRIPTION OF THE DRAWINGS

For a fuller understanding of the nature and advantages of the concepts disclosed herein, reference is made to the detailed description of preferred embodiments and the accompanying drawings.

DETAILED DESCRIPTION

Figure 1:
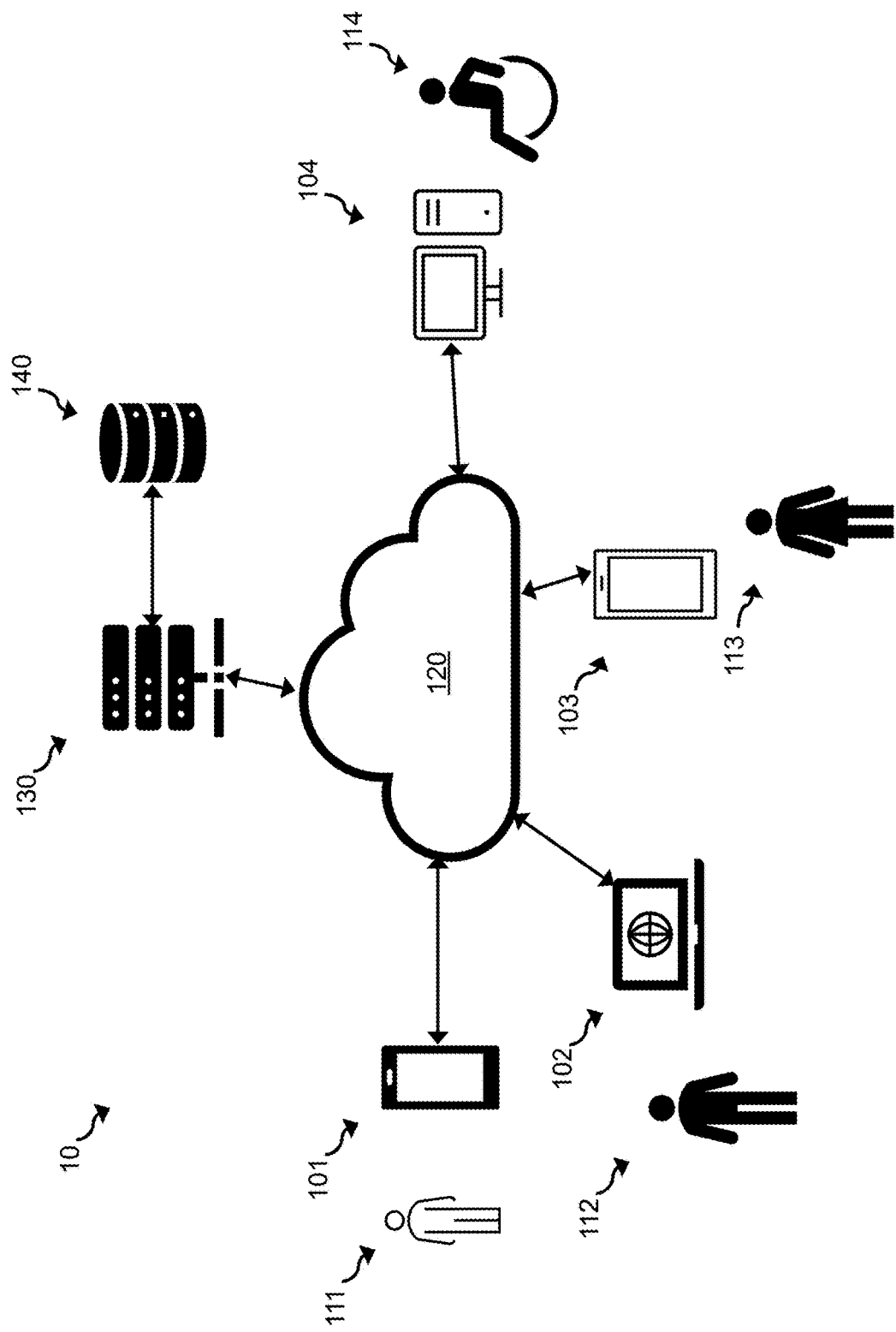
FIG. 1 is a block diagram of an environment 10 that can support one or more embodiments of the invention.

The present system and method address several deficiencies or lack of desired outcomes in the art. In an aspect, the technology addresses privacy concerns whereby a communication device accessible to multiple users accidentally presents content to one of the users who is not the intended recipient user. In another aspect, a sender of content (e.g., an image) may desire to see the reaction or response of the recipient of the content upon its delivery, especially in real time. In yet another aspect, the present system and method offer facial, retina, fingerprint, or other biometric-based confirmation of the identity of a recipient of shared information for added authentication, privacy, and personalization in the context of media communication, social networking applications and similar uses.

The present invention enables supervisory or review authority to authorize the transmission of digital content from a sender to a recipient. The sender is usually the creator of the content (e.g., voice, music, video or audio-visual content, artwork or other digitally stored and transmittable objects). The recipient may have paid for the content, or a third party may have paid the creator to make or send the content to the recipient. In some examples the third party may commission or purchase the content as a gift to the recipient such as artistic or humorous or instructional content from an expert, celebrity, musician, athlete, or other creator. The content is typically considered to be of some value at least to the recipient of the content, but often the content may be of interest and/or value to others in some circles or communities or to the society at large. As can be appreciated, not only do we seek to control the delivery of the content from its source to its recipient, but we may wish to control the subsequent dissemination of the content and may wish to avoid uncontrolled, unauthorized or inappropriate distribution of the same as can happen when some valuable or private content gets released onto the Internet and becomes misused or loses its value.

Here, in addition, we contemplate an authorization of the release of the content. The creator of the content cannot directly send the content to the recipient in this example unless an authorizing party grants permission for the release and delivery of the content. Consider in an example that a celebrity with an agent or attorney who needs to authorize the release of a recording made by the celebrity (artist or athlete or public figure). The parties involved are coupled to a software application or app that runs on personal computing devices of the respective parties, but the content itself and other information and signals are exchanged over a communication network which in turn is typically coupled to a server, e.g., in the cloud.

In a specific example, the recipient or a party wanting to give the recipient a gift of content requests the creator to create a piece of content (e.g., a greeting, advice, or an entertaining or humorous or artistic piece). The creator receives the request for the content, optionally with some context about what they are to create. The creator then generates a suitable piece of content for delivery to the recipient. However, before that exchange is enabled, the creator's representative or agent or authorizing entity receives a signal indicating that some content is to be provided by the creator to the recipient. The authorizing agent reviews the content, and if the content is deemed appropriate for delivery, the authorizing agent may themselves cause the delivery of the content or may simply enter an authorization code or instruction allowing the creator to send the content to the recipient. The content cannot be sent without some authorization or permission signal or code as described.

In another aspect, the content may be sent in the context of an ownership transfer transaction. A blockchain may be used to identify and authenticate the transfer of rights in the content from an original owner or transferor (e.g., the creator) to a new owner or transferee (e.g., the recipient). Additional authorization steps as described herein may be employed to authenticate the nature and identity of the parties during the transaction to ensure that the content is not lost, delivered to an unintended recipient, stolen or otherwise misappropriated. Many details of how to secure the content and authenticate its destination are discussed herein and as described by the present inventor in the above-mentioned records.

A unique and secure representation of a piece of digital content as discussed herein can take the form of a non-fungible token (NFT). The NFT may represent the content as a digital asset which can be sold, licensed or otherwise and can uniquely and securely identify the content objects and their ownership. In this present context the NFT can identify the legal ownership of the content even if the content is accessible in non-exclusive ways by parties other than the content's legal owner. The ownership through the NFT representation can be recorded in a blockchain ledger. Widely used blockchains such as Ethereum or others may be used for the NFT exchange in the present context.

FIG. 1 is a block diagram of an environment 10 that can support one or more embodiments of the invention. The environment 10 includes client computing devices 101-104 in network communication with one or more servers 130 over a communications network 120.

The client computing devices 101-104 can include desktops, laptops, smartphones, tablets, netbooks, and/or other computing devices. Each client device 101-104 includes a processor, a memory operatively coupled to the processor, a display, a physical or virtual keyboard, a mouse, touchscreen or similar pointing device, and a modem to connect to the network 120 (e.g., using an antenna or a communication port). The client devices 101-104 can also include or can be connected to a camera and/or a video camera. In general, each client device 101-104 runs an operating system that handles major housekeeping and coordination of processes on the computer. Each client computing device 101-104 is further adapted and arranged to run an application that allows the users of the client computing devices 101-104 to communicate and share content in transmitted and received data files while ensuring that one or more rules are followed. Each client computing device 101-104 is associated with (e.g., owned by, used by, etc.) a respective user or person 111-114.

The network 120 can be a public or private wide-area network, local-area network, mesh network, and/or other type of communication network. In one or more embodiments, the network 120 is or includes the internet. The network 120 can include a cellular communications network, a wireless local-area network (e.g., a WiFi network that conforms to one or more wireless network standards such as the Institute of Electrical and Electronics Engineers (IEEE) 802.11 standard).

The server(s) 130, or more generally computer(s), can be in network communication with one or more additional servers, one or more databases, one or more client computing devices, and/or other network nodes. For example, the server(s) 130 can be in communication with a database 140 that includes user profile data associated with users 111-114. In an example, user 111 is a requestor, user 112 is a creator, user 113 is an approver, and user 114 is a recipient. In other embodiments, users 111, 112, 113, and/or 114 can have different roles. Each server(s) 130 includes at least one microprocessor that is operatively coupled to computer memory that includes computer-readable instructions that are executable by the microprocessor(s) to perform one or more tasks, steps, and/or methods as described herein.

Figure 2:
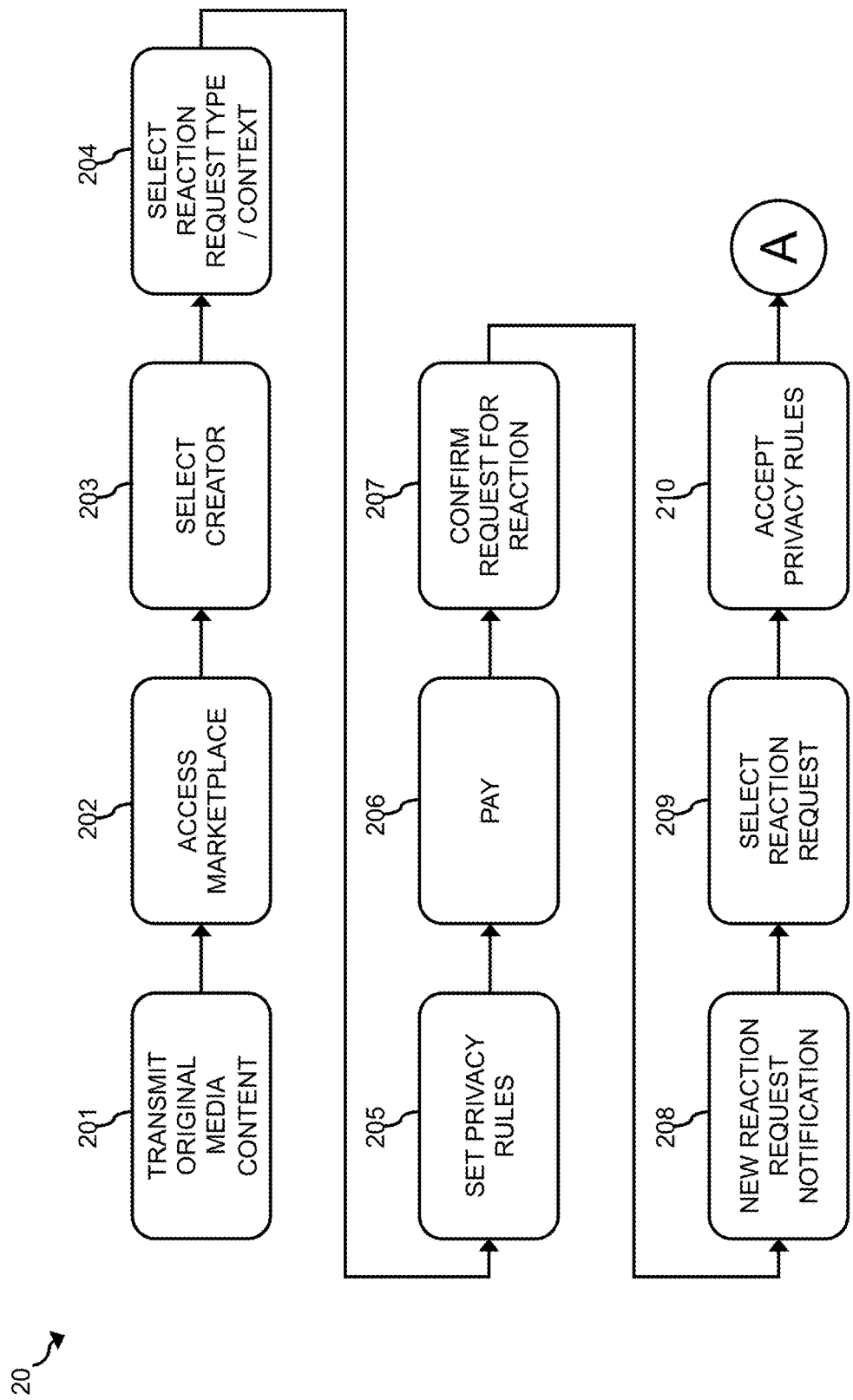
FIG. 2 is a flow chart of a method 20 for securely delivering content over a communications network according to an embodiment.
Figure 2:
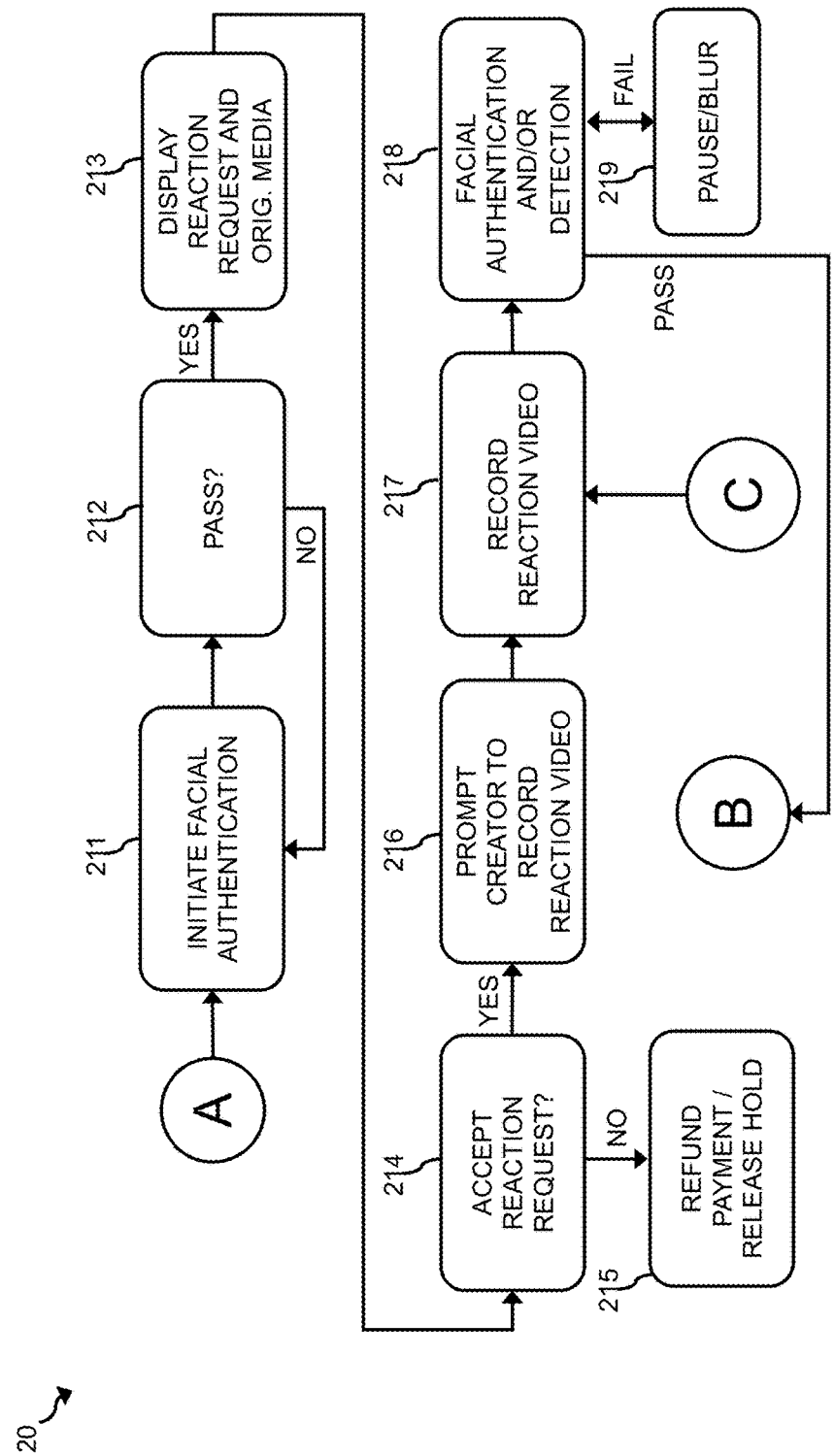
Figure 2:
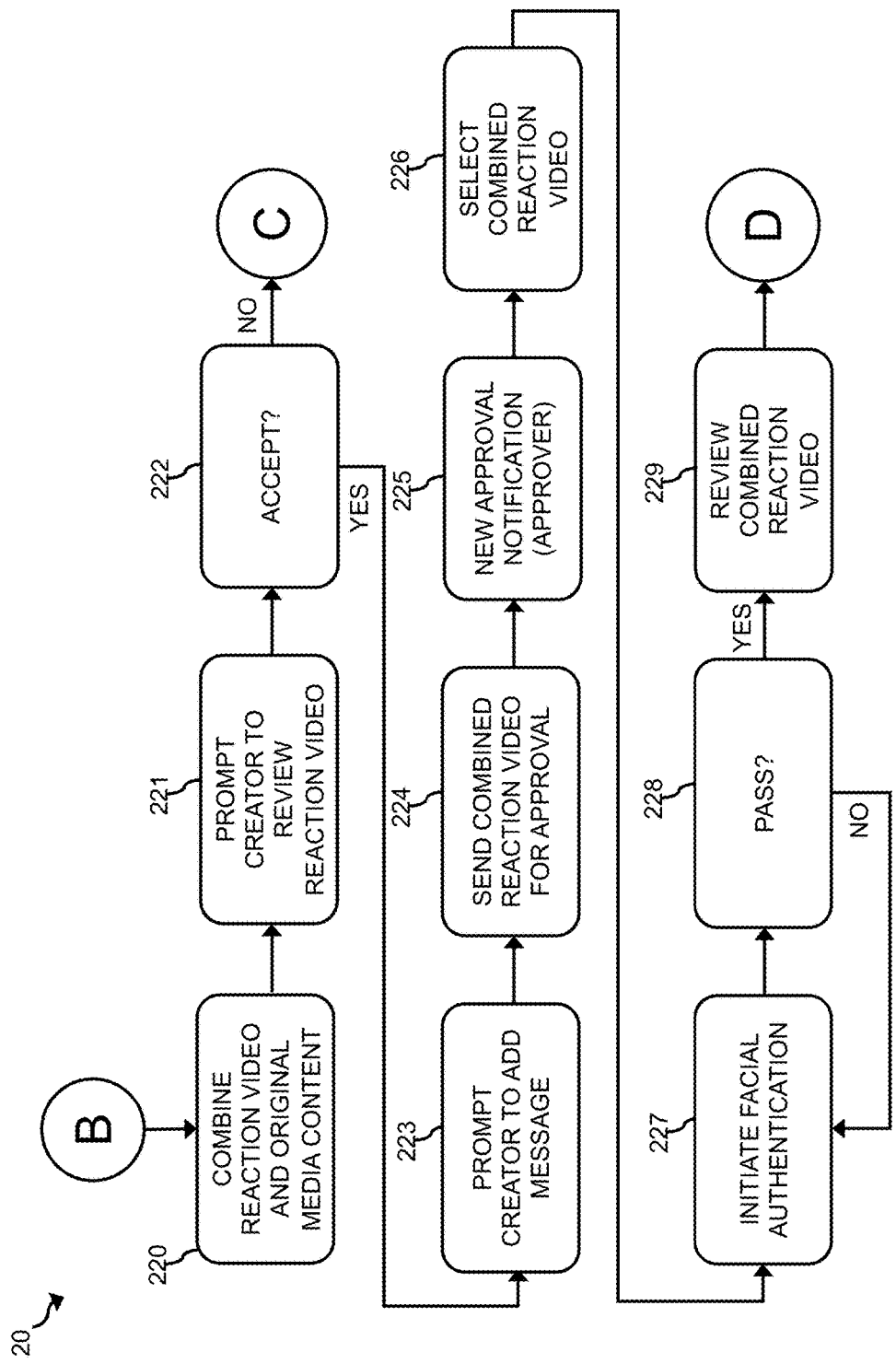
Figure 2:
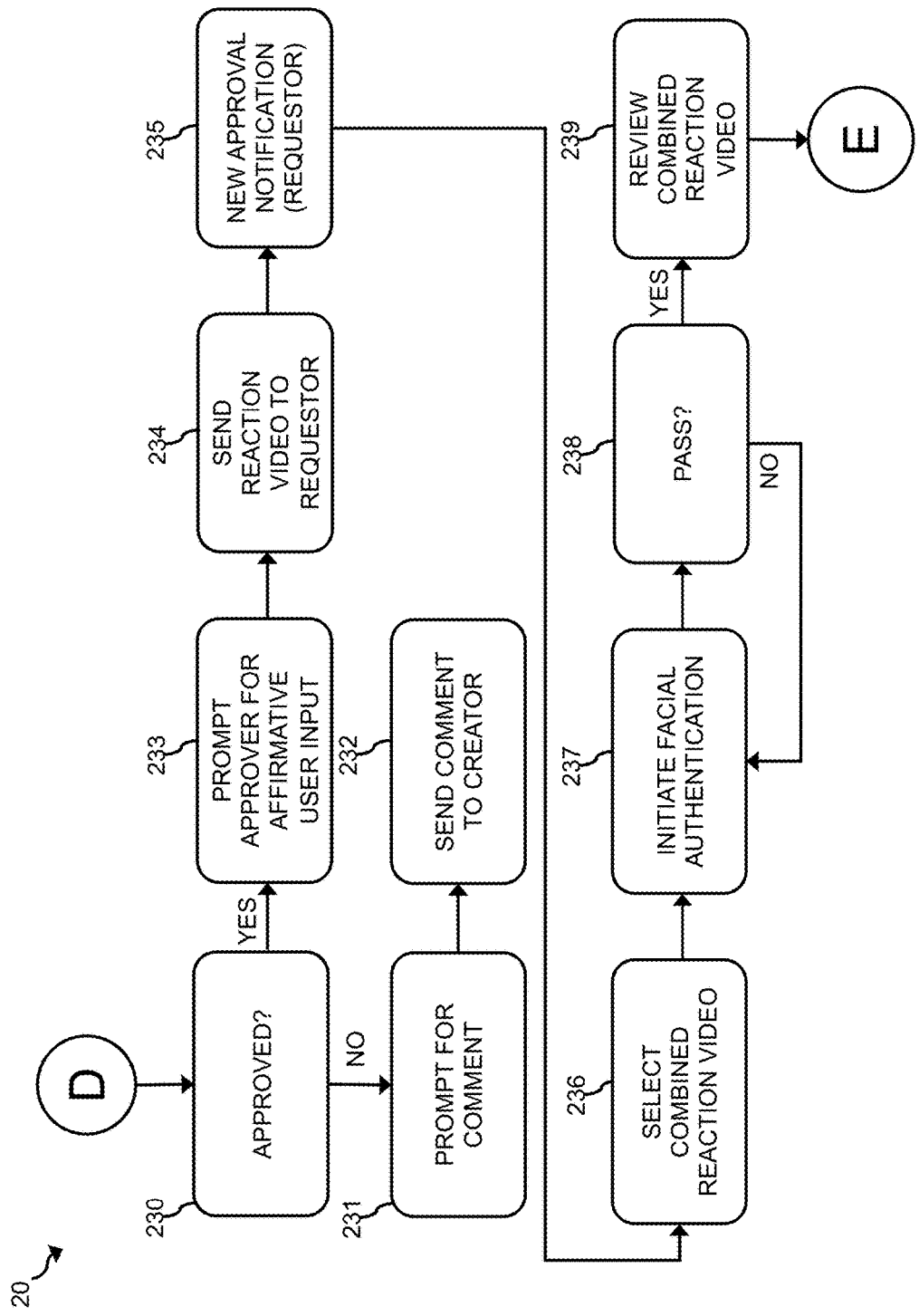
Figure 2:
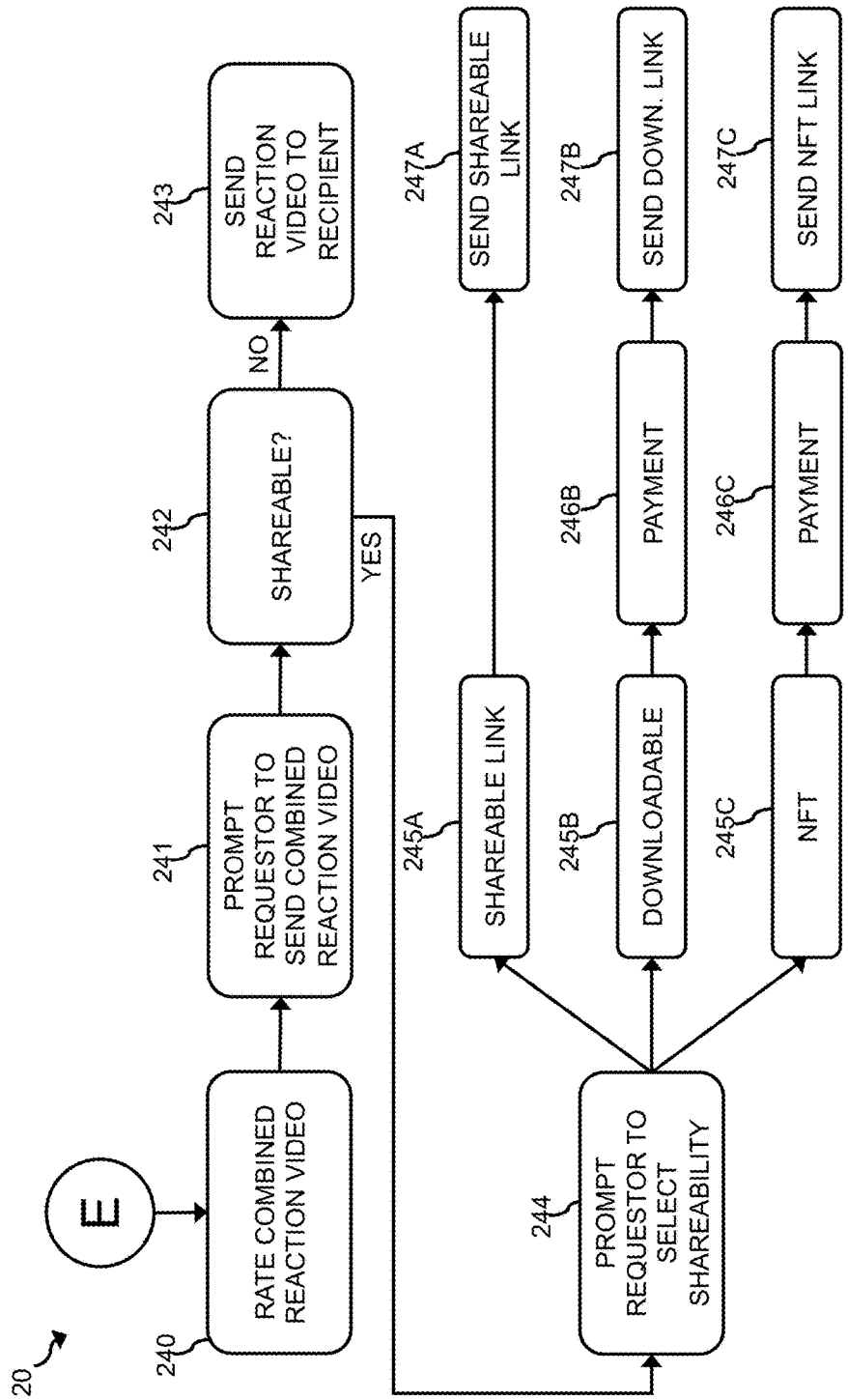

Additional details regarding environment 10 are discussed below with reference to FIG. 2, which is a flow chart of a method 20 for securely delivering content over a communications network according to an embodiment.

In step 201, the requestor 111 uses the requestor's client computing device 101 to transmit an original (e.g., first) media content to the server(s) 130 to which the requestor 111 would like the creator 112 to record a reaction video for delivery to the recipient 114. The original media content can include one or more videos, one or more photographs, one or more audio clips, one or more images, one or more documents, one or more files (e.g., PDFs, word processing files, presentations, spreadsheets, text files), one or more links to files stored on a server, one or more links to websites, and/or other media content. As an illustrative example, the original media content can include a video of the recipient 114 hitting a baseball at a youth baseball game. The requestor 111 can transmit the original media content using a native application on the requestor's client computing device 101, such as a web browser or a dedicated application.

In step 202, the requestor 111 uses the requestor's client computing device 101 to access a marketplace that includes a list of individuals that have agreed to react to original media content for a predetermined fee. The individuals can include celebrities, politicians, professional sports players, professional musicians, professional artists, professional actors, business entrepreneurs, models, professional chefs, subject matter experts, and/or other individuals. The individuals, their respective fees, their respective profiles, and/or any limitations can be included in the user interface for the marketplace. An example of a limitation is that a professional sports player may have a sponsorship deal with a company and cannot react to media content that includes products offered by competing companies. The limitation can include relate to the subject matter or content of the original media content.

In step 203, the requestor 111 uses the requestor's client computing device 101 to select one of the individuals in the marketplace to be the creator 112. Alternatively, if a particular individual is not in the marketplace, the marketplace can include an option for the requestor 111 to invite that individual to join the marketplace. If the user selects this option, the server(s) 130 can initiate contact with the invited individual and/or his/her agent if their contact information is known. Otherwise, the server 130 can send a notification to a human agent who can determine how to contact the invited individual and/or his/her agent or whether to deny the request to contact the invited individual. Using the illustrative example in which the original media content includes a video of the recipient 114 hitting a baseball at a youth baseball game, the requestor 111 can select a professional baseball player from the marketplace to be the creator 112.

In step 204, the requestor 111 is prompted to include information regarding the type or content of the reaction video to be provided by the selected creator 112. The prompt can include a drop-down list and/or a text field into which the requestor 111 can include a message that describes his/her expectations for the reaction video. Using the illustrative example in which the original media content includes a video of the recipient 114 hitting a baseball at a youth baseball game, the requestor 111 can include a message in a text field that states that he/she would like the creator 112 (professional baseball player) to comment on the batting form of the recipient 114 or to act excitedly when the recipient 114 hits the baseball. The information regarding the type or content of the reaction video to be provided by the selected creator 112 is sent to the server(s) 130.

In step 205, the requestor 111 is prompted to set any privacy rules or constraints for the recipient 114 to view or share the reaction video, for the creator 112 after the reaction video is created, and/or for the requestor 111 to view or share the reaction video. The privacy rules can limit the ability of the recipient 114, the creator 112, and/or the requestor 111 to share the reaction video (e.g., on social media, by email, etc.), to take screen shots, etc. In some embodiments, the predetermined fees of the individuals in the marketplace can vary based on the privacy rules. For example, the predetermined fees can be lower when the recipient 114 and/or requestor 111 is/are prohibited from sharing the reaction video on social media and can be higher when the recipient 114 and/or requestor 111 is/are allowed to share the reaction video on social media. In one example, when the requestor 111 selects that the recipient 114 and/or requestor 111 can share the reaction video on social media (or otherwise share it such as by email or text), the requestor 111 can receive a warning message that indicates that the predetermined fee will be increased for this privacy setting. The information regarding the privacy rules, including any agreement to an increase in the predetermined fee, is sent to the server(s) 130.

In step 206, the requestor 111 is prompted to pay the predetermined fee for the reaction video. The requestor 111 can select the payment method and can enter any payment information (e.g., credit card information, online payment system (e.g., PayPal) information, etc.), which is then sent to the server(s) 130 for processing. The server(s) 130 can communicate with one or more payment servers to secure payment. In some embodiments, the payment can be held in escrow or a hold can be placed on the credit card until the requestor 111 approves the reaction video. The payment can be returned if the requestor 111 dislikes the reaction video and wishes to cancel the transaction.

In step 207, the requestor 111 clicks on a send or transmit button to confirm that the requestor 111 wants to proceed with the request for the reaction video. The signal is sent to the server(s) 130 which then sends a request for a reaction video to the creator computing device 102 (e.g., via the creator's account). Alternatively, the server(s) 130 can send the request for the reaction video automatically after the payment is processed in step 206.

In step 208, the creator 112 receives a notification on the creator computing device 102 that he/she has a new request for a reaction video. The notification can be sent via text message, email, and/or through an application running on the creator computing device 102.

In step 209, the creator 112 logs into his/her account (if he/she is not logged into it already) and the creator computing device 102 displays a list of one or more reaction video requests. The creator computing device 102 can optionally display additional information regarding each reaction video request, such as the type or content of the reaction video requested, any message from the requestor 111, the privacy rules requested by the requestor 111, and/or the fee to be earned for each reaction video request. The creator 112 selects one of the reaction video requests in this step. The creator 112 preferably does not have access to the original media content in this step.

In step 210, the creator computing device 102 displays the privacy rules requested by the requestor 111 and prompts the creator 112 to accept them. In some embodiments, the creator 112 can accept one or more privacy rules and can reject one or more privacy rules. Additionally or alternatively, the creator 112 can propose one or more privacy rules as an addition to the accepted privacy rules or as a counterproposal to the rejected privacy rule(s). The rejected and/or alternative privacy rules can be sent to the requestor 111 for negotiation.

In step 211, the creator 112 clicks on a facial authentication button to initiate facial authentication of the creator 112. After the creator 112 clicks on the facial authentication button, the front-facing camera or webcam of the creator computing device 102 is turned on to capture real-time video data of the creator 112. The system compares the real-time video data of the creator 112 to one or more pre-stored images (e.g., photographs) of the creator 112 that includes the creator's face and/or one or more pre-stored videos of the creator 112 that includes the creator's face. The pre-stored image(s) and/or video(s) of the creator 112 were uploaded by the creator 112 prior to step 211. For example, the pre-stored image(s) and/or video(s) may have been uploaded by the creator 112 when he/she created an account and set up his/her user profile. In one embodiment, facial authentication is performed on the server(s) 130. In another embodiment, facial authentication is performed by one or more third-party facial recognition servers (e.g., one or more servers operated by Amazon Web Services that support Amazon's Rekognition service). In another embodiment, facial authentication is performed locally by the creator computing device 102. The facial authentication can return a facial authentication match percentage that can indicate a percentage confidence that the face in the real-time video data and the face in the pre-stored image(s) and/or video(s) are the same (e.g., from the same person). Additional details regarding facial recognition are disclosed in U.S. Pat. No. 10,931,676, which is incorporated by reference as stated above.

In step 212, the server(s) 130 and/or the creator computing device 102 determines whether the creator 112 (e.g., the real-time video data of the creator 112) has passed facial authentication. In one example, the server(s) 130 and/or the creator computing device 102 determine whether the facial recognition match percentage, determined in step 211, is greater than or equal to a threshold facial recognition match percentage, which can be about 60% to about 80% in an embodiment. If the creator 112 passes facial authentication (i.e., step 212=yes), the method 20 proceeds to step 213. If the creator 112 fails facial authentication (i.e., step 212=no), the method 20 returns to step 211 to allow the creator 112 to initiate facial authentication again. In some embodiments, the system only allows the creator 112 or other user a maximum number of attempts for facial authentication after which the creator's account is locked and/or the creator 112 must wait a predetermined time period to attempt facial authentication another time. A notification can automatically be sent to the email address and/or phone number (e.g., text or voice call) in the creator's profile to inform the creator 112 of the failed facial authentication attempts.

After the creator 112 has been facially authenticated, the creator 112 can review the reaction video request including the original media content in step 213. In step 214, the creator 112 is prompted to accept or reject the reaction video request viewed in step 213. If the creator 112 rejects the reaction video request (i.e., step 214=no), in step 215 the creator computing device 102 sends a signal or message to the server(s) 130 that causes the server(s) 130 to refund any payment to the requestor 111. If a hold was placed on the requestor's credit card or other online payment account (e.g., in lieu of payment), the hold is released. A confirmation screen, button, and/or window can optionally be displayed after the creator 112 rejects the reaction video request. The confirmation screen, button, and/or window can require an additional input by the creator 112 to confirm his/her rejection of the reaction video request.

If the creator 112 accepts the reaction video request (i.e., step 214=yes), the creator 112 is prompted to record a reaction video in step 216. In step 217, the creator 112 records a reaction video while simultaneously watching, viewing, and/or listening to the original media content provided by the requestor 111. The reaction video is recorded using a camera and microphone that are part of or coupled to the creator computing device 102. For example, the creator computing device 102 can include a front-facing camera or can be coupled (e.g., via a wired or wireless connection) to a webcam. The original media content can be displayed on a display screen on or coupled to the creator computing device 102. While the reaction video is being recorded in step 217, the system can simultaneously and continuously perform facial authentication and/or facial detection of the creator 112.

Facial authentication is performed in the same manner as in step 211. Facial detection, which does not verify identity but detects the presence (or absence) of a face in a camera's field of view, is performed by the creator computing device 102 (e.g., a smartphone) using facial detection features of the device's operating system. Facial detection can determine whether the user's face is properly framed in the front-facing camera viewport or an additional or unauthorized viewer is detected. When facial authentication and/or facial detection fails, the playback of the original media content and recording of the reaction video are immediately paused/stopped and preferably blurred in step 219. The creator computing device 102 can pause the original media content or the creator computing device 102 can send a signal to the server(s) 130 that indicates whether the creator 112 passes or fails facial detection, and the server(s) 130 can cause the original media content to be paused and/or blurred based on the received signal. Playback of the original media content and recording of the reaction video remain paused and preferably blurred until the facial authentication and facial detection passes (if both facial authentication and facial detection are performed in step 218), at which point the creator 112 can continue viewing the original media content and recording the reaction video. The system continues to perform facial authentication and/or facial detection until the reaction video is fully recorded (e.g., when the creator 112 presses a button on the user interface to stop recording). Additional details regarding facial detection are disclosed in U.S. Pat. No. 10,931,676, discussed above.

After the reaction video is fully recorded, the server(s) 130 combine and time-synchronize the reaction video and the original media content in step 220 (via placeholder B) to form a synchronized video file. The server(s) 130 can also format the synchronized file, for example such that the original media content is displayed in one window and the reaction video is displayed in another window, such as in a picture-in-picture format. The relative size of each window can be adjusted. For example, the window for the original media content can be smaller than the window for the reaction video.

After the reaction video and the original media content are combined, the creator computing device 102 prompts the creator 112 to review the recorded reaction video in step 221. The recorded reaction video can be displayed on the display screen on or coupled to the creator computing device 102. After displaying the recorded reaction video, the creator 112 is prompted to accept or reject the recorded reaction video in step 222. If the creator 112 rejects the recorded reaction video (i.e., step 222=no), the creator 112 can record a new reaction video in step 217 (via placeholder C), in which case the previous recorded reaction video can be deleted. This process continues in a loop until the creator 112 approves the recorded reaction video (i.e., step 222=yes). Continuing with the illustrative example in which the original media content includes a video of the recipient 114 hitting a baseball at a youth baseball game, the reaction video can include a video of a professional baseball player cheering and/or commenting on the hitting form of the recipient 114.

After the creator 112 approves the recorded reaction video, in step 223 the creator 112 is prompted to add an optional message or comment that can be included with the reaction video. The message or comment can include a comment relating to the recipient 114, original media content, and/or reaction video.

In step 224, the creator 112 finalizes the reaction video and message by sending the synchronized file and optional message to the approver 113 for review and approval. The approver 113 can be a talent/sports agent, an attorney for the creator 112, a family member, or another trusted person associated with the creator 112. After the synchronized file and optional message are sent for review and approval, in step 225 the approver 113 receives a new approval notification. The notification can be sent via text message, email, and/or through an application running on the approver computing device 103.

In step 226, the approver 113 selects the synchronized file and optional message for review. Before the approver 113 can review the synchronized file and optional message, in step 227 the approver 113 clicks on a facial authentication button to initiate facial authentication, which can be performed in the same manner as in steps 211 and 218. If the approver 113 passes facial authentication (i.e., step 228=yes), the method 20 proceeds to step 229. If the approver 113 fails facial authentication (i.e., step 228=no), the method 20 returns to step 227 to allow the approver 113 to initiate facial authentication again. In some embodiments, the system only allows the approver 113 a maximum number of attempts for facial authentication after which the approver's account is locked and/or the approver 113 must wait a predetermined time period to attempt facial authentication another time. A notification can automatically be sent to the email address and/or phone number (e.g., text or voice call) to inform the approver 113 of the failed facial authentication attempts.

After the approver 113 has been facially authenticated, the approver 113 reviews the synchronized file and optional message in step 229. In step 230 (via placeholder D), the approver 113 is prompted to approve or reject the synchronized file and optional message. If the synchronized file and optional message are rejected (i.e. step 230=no), in step 231 the approver 113 is prompted to include a comment for the creator 112 on the reasons for the rejection. The prompt can include a list of pre-selected comments from which the approver 113 selects (e.g., via a radio button, drop down list, or another user interface) and/or a text box into which the approver 113 can type a free-text narrative comment. Referring again to the illustrative example in which the original media content includes a video of the recipient 114 hitting a baseball at a youth baseball game, the approver 113 may disapprove the reaction video because the child was wearing a shirt with a brand in violation of an endorsement deal that the creator 112 may have. In another example, the approver 113 may disapprove the reaction video and/or the optional message because they include inappropriate language that may harm the creator's public image. The comment and rejection are sent to the creator 112 as feedback in step 232.

If the synchronized file and optional message are approved (i.e. step 230=yes), the approver 113 is prompted to affirmatively press a user-interface button, enter a password or authorization code, and/or provide other affirmative user input to indicate approval in step 233. After the approver 113 has affirmatively approved the synchronized file and optional message, the synchronized file and optional message are sent to the requestor in step 234.

After synchronized file and optional message are approved, in step 235 the requestor 111 receives a new approval notification. The notification can be sent via text message, email, and/or through an application running on the requestor computing device 101.

In step 236, the requestor 111 selects the synchronized file and optional message for review. Before the requestor 111 can review the synchronized file and optional message, in step 237 the requestor 111 clicks on a facial authentication button to initiate facial authentication, which can be performed in the same manner as in steps 211, 218, and 227. If the requestor 111 passes facial authentication (i.e., step 238=yes), the method 20 proceeds to step 239. If the requestor 111 fails facial authentication (i.e., step 238=no), the method 20 returns to step 237 to allow the requestor 111 to initiate facial authentication again. In some embodiments, the system only allows the requestor 111 a maximum number of attempts for facial authentication after which the approver's account is locked and/or the requestor 111 must wait a predetermined time period to attempt facial authentication another time. A notification can automatically be sent to the email address and/or phone number (e.g., text or voice call) in the approver's profile to inform the requestor 111 of the failed facial authentication attempts.

After the requestor 111 has been facially authenticated, the requestor 111 reviews the synchronized file and optional message in step 239. The requestor 111 can review the synchronized file and optional message on a display screen on or coupled to the requestor computing device 101. In step 240 (via placeholder E), the requestor 111 is prompted to rate the synchronized file. Additionally or alternatively, the requestor 111 can send a message to the creator 112 (e.g., using a text box). In step 241, the requestor 111 is prompted to send the synchronized file and optional message to the recipient 114, such as by clicking on a send button.

After the requestor 111 indicates that the synchronized file and optional message are to be sent to the recipient 114, the server(s) 130 check the privacy rules for the reaction request. If the privacy rules indicate that the reaction request was to be private to the recipient 114 (i.e., step 242=no), the recipient 114 receives a new synchronized file notification. The recipient 114 can be facially authenticated (e.g., as in steps as in steps 211, 218, 227, and 237) to view the synchronized file and optional message. In some embodiments, facial detection can also be used while the recipient 114 views the synchronized file and optional message to ensure that the recipient 114 is the only person viewing the content.

If the privacy rules indicate that the reaction request was to be shareable for the recipient 114 (i.e., step 242=yes), the requestor 111 is prompted in step 244 to select the shareability properties of the synchronized file and optional message. In an embodiment, the default shareability is set to view-only which allows the requestor 111 to send a shareable link 245A to others to view the original video and/or the reaction video. However, the requestor 111 may desire increased shareability options, which can be provided for additional fees. For example, the requestor 111 can request a downloadable file 245B of the synchronized file. In another example, the requestor 111 can request an NFT 245C that represents ownership of the synchronized file. If the requestor 111 selects a downloadable file 245B or NFT 245C, the requestor 111 may be required to pay additional fees in steps 246B, 246C, respectively. In steps 247A, B, and/or C, the appropriate link is created and sent to the requestor 111 and/or to the recipient 114.

In some embodiments, the system can record and create a time-synchronized reaction video of the recipient 114 viewing the synchronized file, which can be shared with the requestor 111 and/or with the creator 112.

Figure 3:
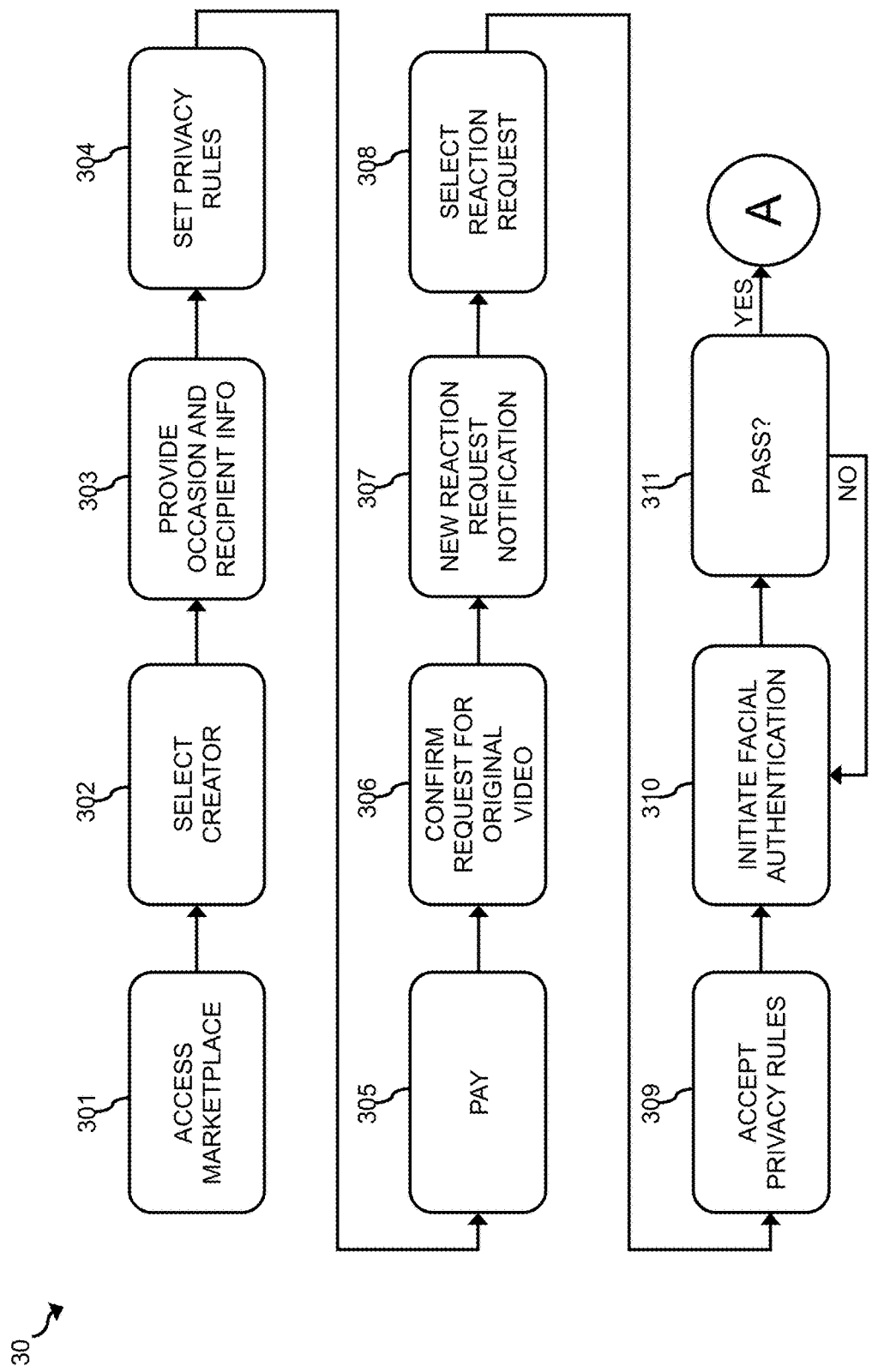
FIG. 3 is a flow chart of a method 30 for securely delivering content over a communications network according to another embodiment.
Figure 3:
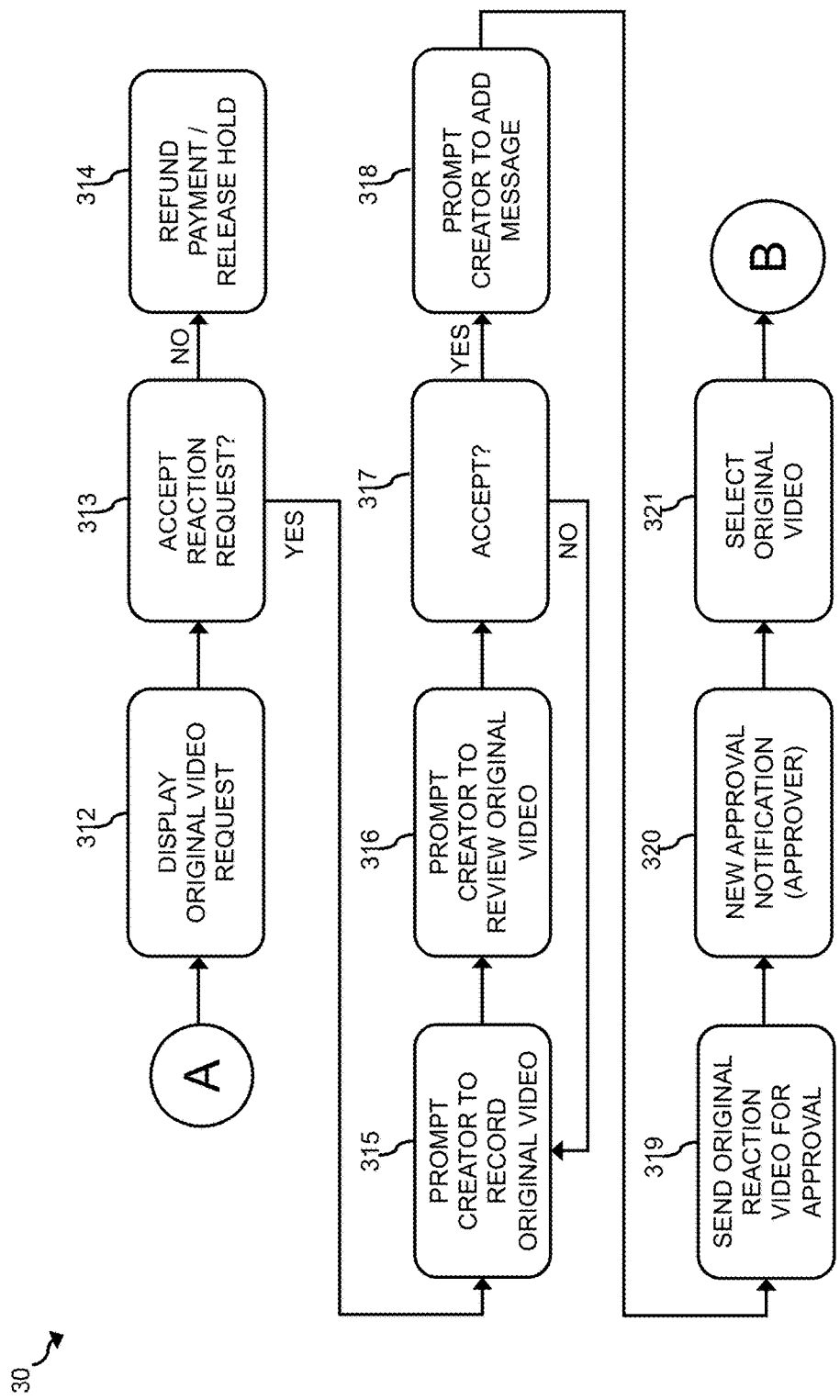
Figure 3:
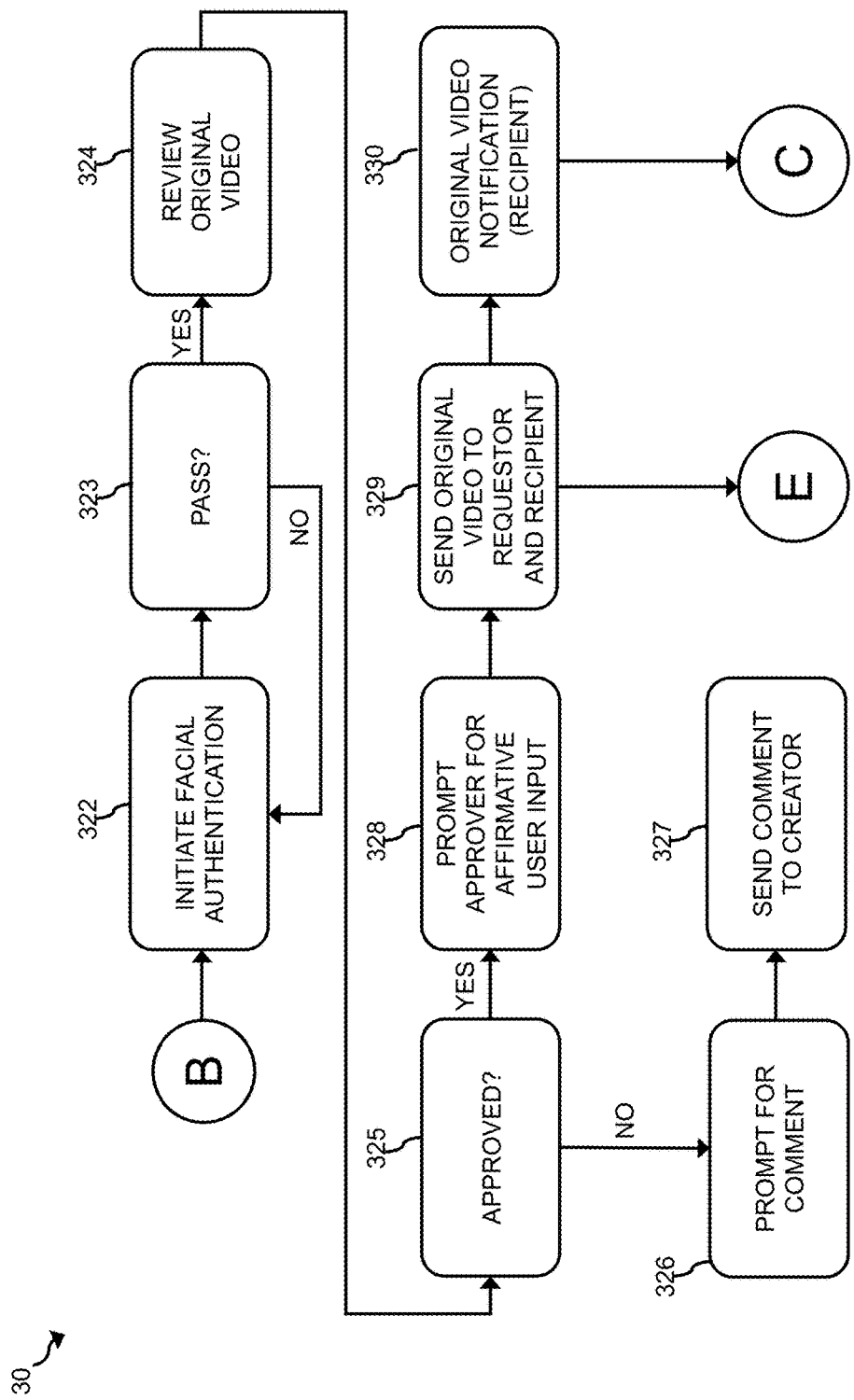
Figure 3:
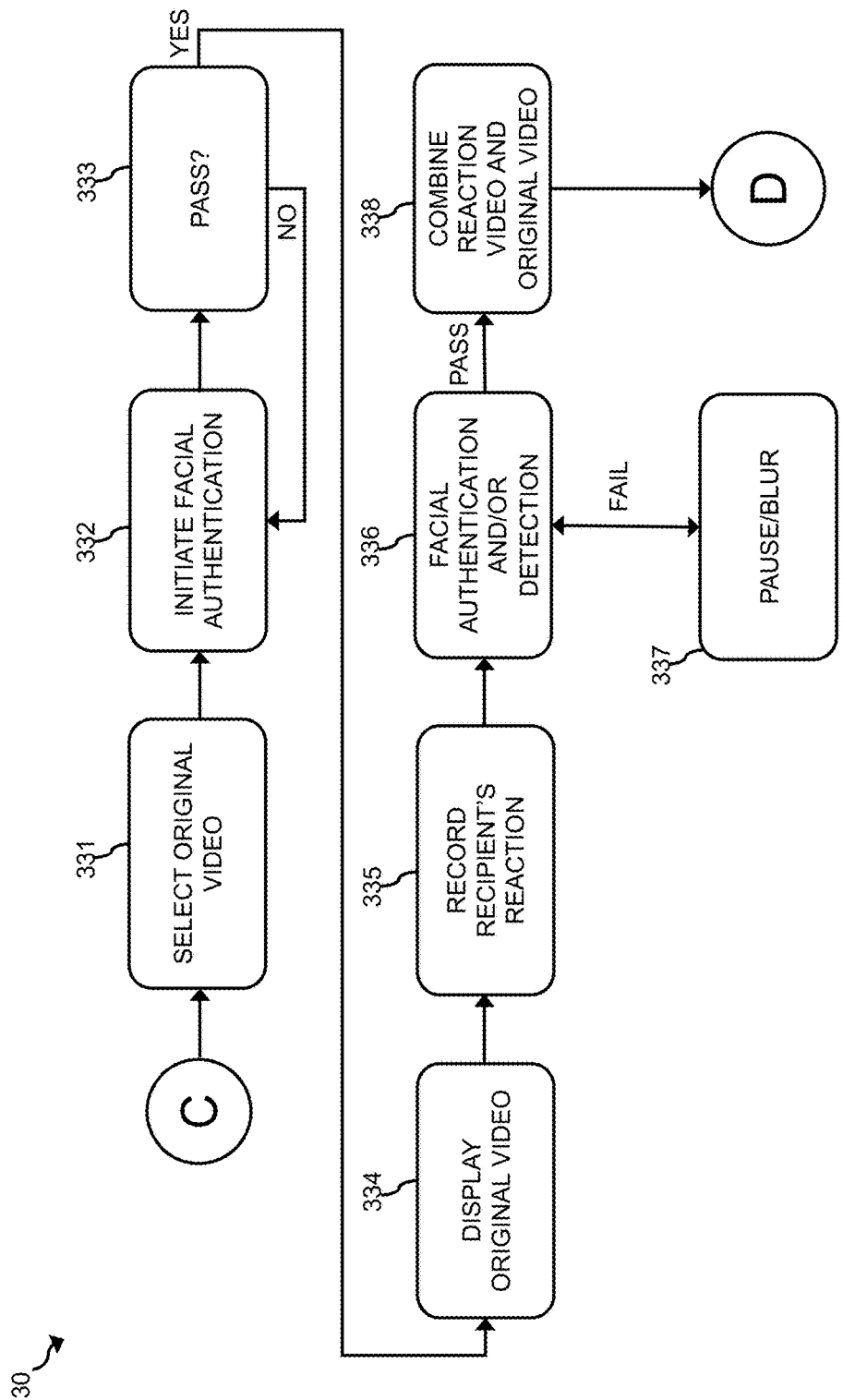
Figure 3:
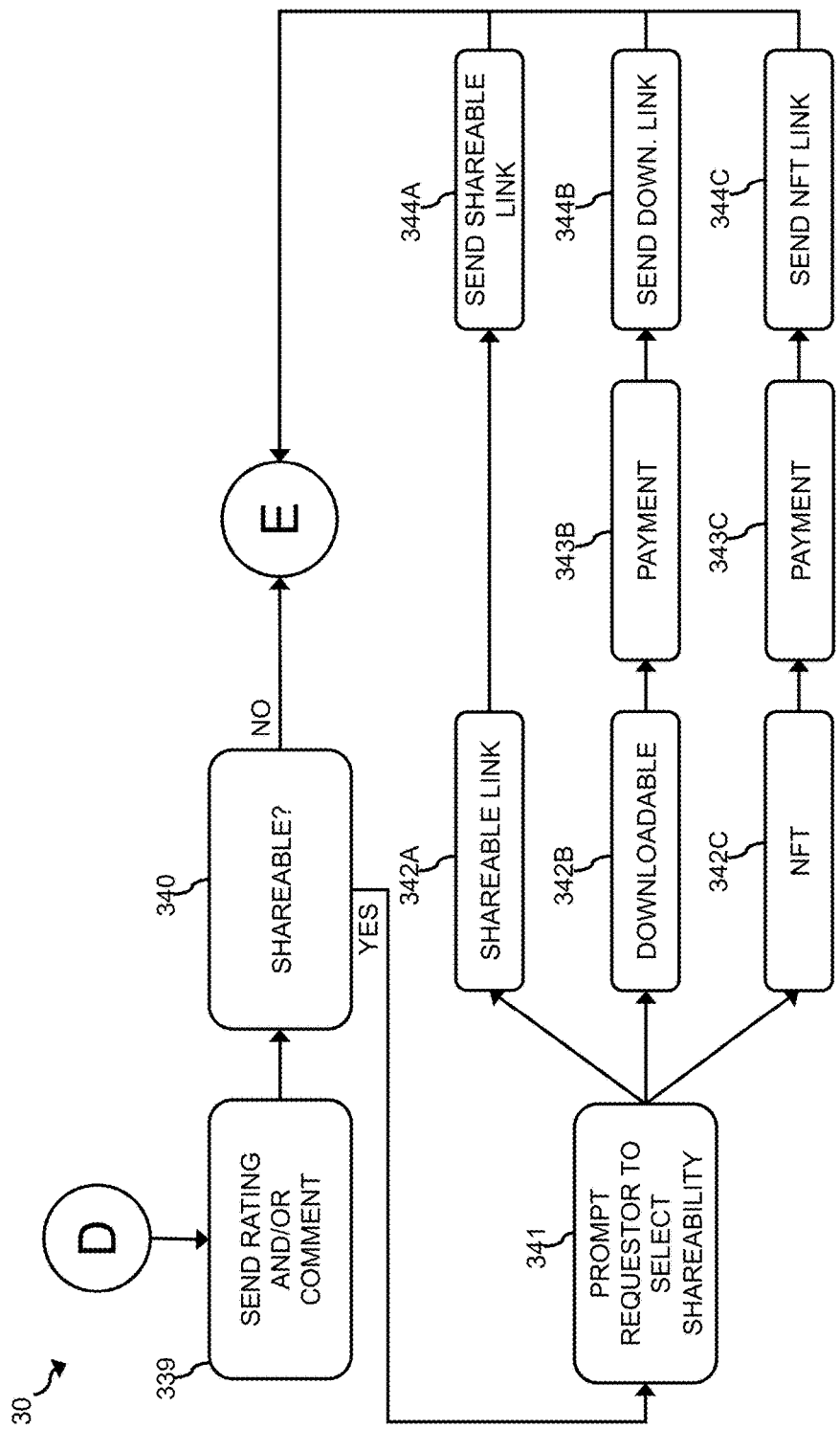
Figure 3:
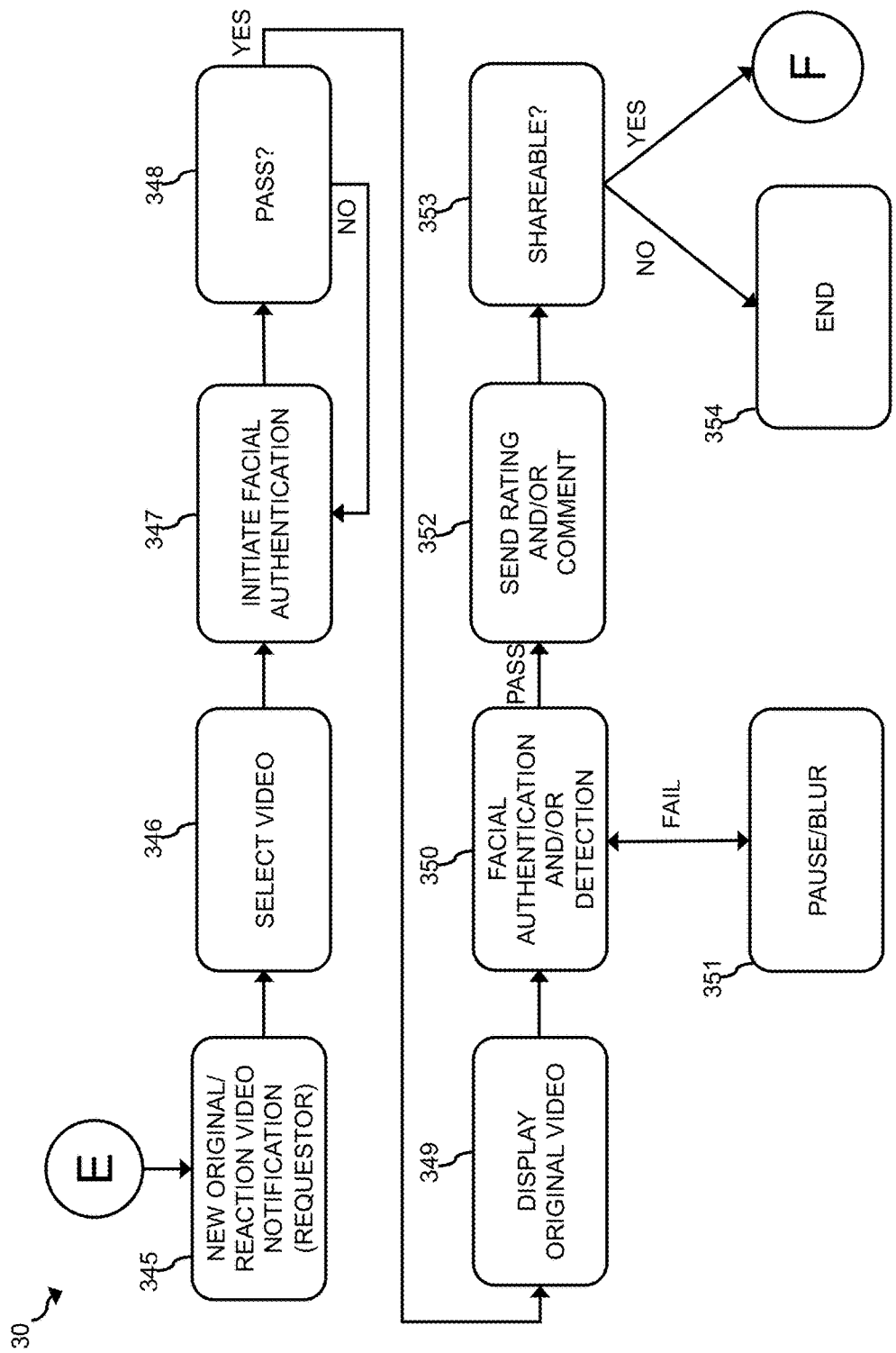
Figure 3:
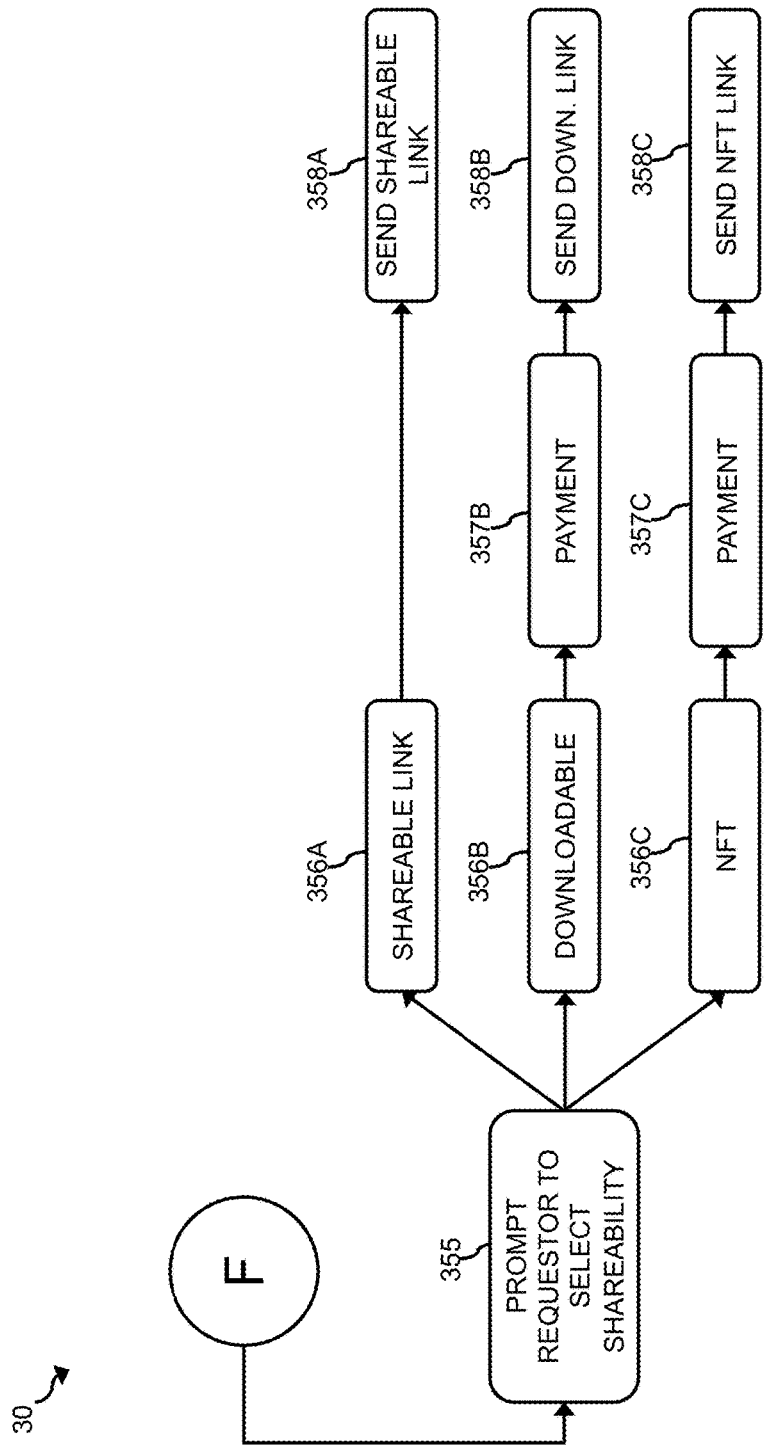

FIG. 3 is a flow chart of a method 30 for securely delivering content over a communications network according to another embodiment. Method 30 can be performed in or using environment 10.

In step 301, the requestor 111 uses the requestor's client computing device 101 to access a marketplace that includes a list of individuals that have agreed to create an original video to be delivered to a recipient for a predetermined fee. The individuals can include celebrities, politicians, professional sports players, professional musicians, professional artists, professional actors, business entrepreneurs, models, professional chefs, subject matter experts, and/or other individuals. The individuals, their respective fees, their respective profiles, and/or any limitations can be included in the user interface for the marketplace. The marketplace and/or individuals that can be accessed in step 301 can be the same as the marketplace and/or individuals that can be accessed in step 202.

In step 302, the requestor 111 uses the requestor's client computing device 101 to select one of the individuals in the marketplace to be the creator 112. Alternatively, if a particular individual is not in the marketplace, the marketplace can include an option for the requestor 111 to invite that individual to join the marketplace. If the user selects this option, the server(s) 130 can initiate contact with the invited individual and/or his/her agent if their contact information is known. Otherwise, the server 130 can send a notification to a human agent who can determine how to contact the invited individual and/or his/her agent or whether to deny the request to contact the invited individual. In an example, the creator 112 can select a celebrity as the creator to wish the recipient 114 a happy birthday.

In step 303, the requestor 111 is prompted to provide information on the recipient 114, the occasion/purpose of the request for the original video, and any context, instructions, and/or details regarding the request. Information on the recipient 114 can include the recipient's name, age, email address, cell phone number, and/or other information. The occasion/purpose can include a birthday, an anniversary, an achievement (e.g., graduation, winning a race/game, etc.), or another occasion/purpose. The context, instructions, and/or details can include additional details regarding the occasion/purpose. In one example, the occasion/purpose is a birthday and the context, instructions, and/or details include the recipient's birthday, how old he/she will be, and some interests or details for the creator 112 to include in the original video.

In step 304, the requestor 111 is prompted to set any privacy rules or constraints for the recipient 114 when viewing the reaction video and/or for the creator 112 after the original video is created. The privacy rules can limit the ability of the recipient 114 and/or creator 112 to share the original video (e.g., on social media, by email, etc.), to take screen shots, etc. In some embodiments, the predetermined fees of the individuals in the marketplace can vary based on the privacy rules. For example, the predetermined fees can be lower when the recipient 114 and/or creator 112 is prohibited from sharing the original video on social media and can be higher when the recipient 114 is allowed to share the original video on social media. In one example, when the requestor 111 selects that the recipient 114 can share the original video on social media (or otherwise share it such as by email or text), the requestor 111 can receive a warning message that indicates that the predetermined fee will be increased for this privacy setting. The information regarding the privacy rule selection, including any agreement to an increase in the predetermined fee, is sent to the server(s) 130.

In step 305, the requestor 111 is prompted to pay the predetermined fee for the original video. The requestor 111 can select the payment method and can enter any payment information (e.g., credit card information, online payment system (e.g., PayPal) information, etc.), which is then sent to the server(s) 130 for processing. The server(s) 130 can communicate with one or more payment servers to secure payment. In some embodiments, the payment can be held in escrow or a hold can be placed on the credit card until the requestor 111 approves the original video. The payment can be returned if the requestor 111 dislikes the original video and wishes to cancel the transaction.

In step 306, the requestor 111 clicks on a send or transmit button to confirm that the requestor 111 wants to proceed with the request for the original video. The signal is sent to the server(s) 130 which then sends a request for an original video to the creator computing device 102 (e.g., via the creator's account). Alternatively, the server(s) 130 can send the request for the original video automatically after the payment is processed in step 305.

In step 307, the creator 112 receives a notification on the creator computing device 102 that he/she has a new request for an original video. The notification can be sent via text message, email, and/or through an application running on the creator computing device 102.

In step 308, the creator 112 logs into his/her account (if he/she is not logged into it already) and the creator computing device 102 displays a list of one or more original video requests. The creator computing device 102 can optionally display additional information regarding each original video request, such as the type or content of the original video requested, the context, instructions, and/or details provided by the requestor 111, the privacy rules requested by the requestor 111, and/or the fee to be earned for each original video request. The creator 112 selects one of the original video requests in this step.

In step 309, the creator computing device 102 displays the privacy rules requested by the requestor 111 and prompts the creator 112 to accept them. In some embodiments, the creator 112 can accept one or more privacy rules and can reject one or more privacy rules. Additionally or alternatively, the creator 112 can propose one or more privacy rules as an addition to the accepted privacy rules or as a counterproposal to the rejected privacy rule(s). The rejected and/or alternative privacy rules can be sent to the requestor 111 for negotiation.

In step 310, the creator 112 clicks on a facial authentication button to initiate facial authentication of the creator 112. After the creator 112 clicks on the facial authentication button, the front-facing camera or webcam of the creator computing device 102 is turned on to capture real-time video data of the creator 112. The system compares the real-time video data of the creator 112 to one or more pre-stored images (e.g., photographs) of the creator 112 that includes the creator's face and/or one or more pre-stored videos of the creator 112 that includes the creator's face. The pre-stored image(s) and/or video(s) of the creator 112 were uploaded by the creator 112 prior to step 310. For example, the pre-stored image(s) and/or video(s) may have been uploaded by the creator 112 when he/she created an account and set up his/her user profile. In one embodiment, facial authentication is performed on the server(s) 130. In another embodiment, facial authentication is performed by one or more third-party facial recognition servers (e.g., one or more servers operated by Amazon Web Services that support Amazon's Rekognition service). In another embodiment, facial authentication is performed locally by the creator computing device 102. The facial authentication can return a facial authentication match percentage that can indicate a percentage confidence that the face in the real-time video data and the face in the pre-stored image(s) and/or video(s) are the same (e.g., from the same person).

In step 311, the server(s) 130 and/or the creator computing device 102 determines whether the creator 112 (e.g., the real-time video data of the creator 112) has passed facial authentication. In one example, the server(s) 130 and/or the creator computing device 102 determine whether the facial recognition match percentage, determined in step 310, is greater than or equal to a threshold facial recognition match percentage, which can be about 60% to about 80% in an embodiment. If the creator 112 passes facial authentication (i.e., step 311=yes), the method 30 proceeds to step 312 (via placeholder A). If the creator 112 fails facial authentication (i.e., step 311=no), the method 30 returns to step 310 to allow the creator 112 to initiate facial authentication again. In some embodiments, the system only allows the creator 112 or other user a maximum number of attempts for facial authentication after which the creator's account is locked and/or the creator 112 must wait a predetermined time period to attempt facial authentication another time. A notification can automatically be sent to the email address and/or phone number (e.g., text or voice call) in the creator's profile to inform the creator 112 of the failed facial authentication attempts.

After the creator 112 has been facially authenticated, the original video request is displayed on the creator computing device 102 for review by the creator 112. The creator computing device 102 can display the type or content of the original video requested, the context, instructions, and/or details provided by the requestor 111, the privacy rules requested by the requestor 111, and/or the fee to be earned for the selected original video request.

In step 313, the creator 112 is prompted to accept or reject the original video request viewed in step 312. If the creator 112 rejects the reaction video request (i.e., step 313=no), in step 314 the creator computing device 102 sends a signal or message to the server(s) 130 that causes the server(s) 130 to refund any payment to the requestor 111. If a hold was placed on the requestor's credit card or other online payment account (e.g., in lieu of payment), the hold is released. A confirmation screen, button, and/or window can optionally be displayed after the creator 112 rejects the reaction video request. The confirmation screen, button, and/or window can require an additional input by the creator 112 to confirm his/her rejection of the original video request.

If the creator 112 accepts the reaction video request (i.e., step 313=yes), the creator 112 is prompted to record or provide an original video in step 315. In an embodiment, the creator 112 records the original video while an application running on the creator computing device 102 captures the video data. In another embodiment, the creator 112 records the original video using the creator computing device 102 or another device and then uploads the original video to the server(s) 130 (e.g., using an application running on the creator computing device 102 or on another device). In another embodiment, the creator 112 first stores the original video on a third-party server (e.g. DropBox, Google Drive, etc.) and then provides/inserts a link to the original video.

After the original video is record or provided, the creator computing device 102 prompts the creator 112 to review the recorded original video in step 316. The recorded original video can be displayed on the display screen on or coupled to the creator computing device 102. After displaying the recorded original video, the creator 112 is prompted to accept or reject the recorded original video in step 317. If the creator 112 rejects the recorded original video (i.e., step 317=no), the creator 112 can record a new reaction video in step 315, in which case the previous recorded original video can be deleted. This process continues in a loop until the creator 112 approves the recorded reaction video (i.e., step 317=yes).

After the creator 112 approves the recorded original video, the creator 112 can add an optional message or comment that can be included with the original video in optional step 318. The message or comment can include a comment relating to the recipient 114 and/or the occasion or reason for the request. In step 319, the creator 112 finalizes the original video and optional message by sending the original video and optional message to the approver 113 for review and approval. The approver 113 can be a talent/sports agent, an attorney for the creator 112, a family member, or another trusted person associated with the creator 112. After the original video and optional message are sent for review and approval, in step 320 the approver 113 receives a new approval notification. The notification can be sent via text message, email, and/or through an application running on the approver computing device 103.

In step 321, the approver 113 selects the original video and optional message for review. Before the approver 113 can review the original video and optional message, in step 322 (via placeholder B) the approver 113 clicks on a facial authentication button to initiate facial authentication, which can be performed in the same manner as in step 310. If the approver 113 passes facial authentication (i.e., step 323=yes), the method 30 proceeds to step 324. If the approver 113 fails facial authentication (i.e., step 323=no), the method 30 returns to step 322 to allow the approver 113 to initiate facial authentication again. In some embodiments, the system only allows the approver 113 a maximum number of attempts for facial authentication after which the approver's account is locked and/or the approver 113 must wait a predetermined time period to attempt facial authentication another time. A notification can automatically be sent to the email address and/or phone number (e.g., text or voice call) in the approver's profile to inform the approver 113 of the failed facial authentication attempts.

After the approver 113 has been facially authenticated, the approver 113 reviews the original video and optional message in step 324. In step 325, the approver 113 is prompted to approve or reject the original video and optional message. If the synchronized file and optional message are rejected (i.e. step 325=no), in step 326 the approver 113 is prompted to include a comment for the creator 112 on the reasons for the rejection. The prompt can include a list of pre-selected comments from which the approver 113 selects (e.g., via a radio button, drop down list, or another user interface) and/or a text box into which the approver 113 can type a free-text narrative comment. For example, the approver 113 may disapprove the reaction video and/or the optional message because they include inappropriate language that may harm the creator's public image. In another example, the approver 113 may disapprove the original video because the approver is wearing clothing or holding an object in violation of an endorsement deal. The comment and rejection are sent to the creator 112 as feedback in step 327.

If the original file and optional message are approved (i.e. step 325=yes), the approver 113 is prompted to affirmatively press a user-interface button, enter a password or authorization code, and/or provide other affirmative user input to indicate approval in step 328. After the approver 113 has affirmatively approved the original file and optional message, the original video and optional message are sent to the requestor 111 and recipient 114 in step 329. The original video can be sent to the requestor 111 and recipient 114 simultaneously or serially.

In step 330, the recipient 114 receives a notification that an original video is available to view. The notification can be sent via text message, email, and/or through an application running on the recipient computing device 104.

In step 331 (via placeholder C), the recipient 114 selects the original video to view (e.g., after logging into the application). Before the recipient 114 can view the original video and optional message, in step 332 the recipient 114 clicks on a facial authentication button to initiate facial authentication, which can be performed in the same manner as in steps 310 and 322. If the recipient 114 passes facial authentication (i.e., step 333=yes), the method 30 proceeds to step 334. If the recipient 114 fails facial authentication (i.e., step 333=no), the method 30 returns to step 332 to allow the recipient 114 to initiate facial authentication again. In some embodiments, the system only allows the recipient 114 a maximum number of attempts for facial authentication after which the recipient's account is locked and/or the recipient 114 must wait a predetermined time period to attempt facial authentication another time. A notification can automatically be sent to the email address and/or phone number (e.g., text or voice call) in the recipient's profile to inform the recipient 114 of the failed facial authentication attempts.

After the recipient 114 has been facially authenticated, the recipient 114 reviews the original video and optional message in step 334. While the recipient 114 reviews the original video and optional message, a video of the recipient's reaction is simultaneously recorded in step 335. The recipient's reaction can be recorded using a front-facing camera on or a webcam coupled to the recipient computing device 104. The video of the recipient's reaction can also used for facial authentication and/or facial detection in step 336, which can be performed in the same manner as in step 218. If facial authentication or facial detection fails, playback of the original video and recording of the reaction video are paused or stopped in step 337 until facial authentication and/or facial detection are passed (or both facial authentication and facial detection are passed if both are implemented). The original video is preferably blurred when facial authentication and/or facial detection fails. The system continues to perform facial authentication and/or facial detection until the original video is fully viewed.

After the original video is fully viewed and the reaction video is recorded, the server(s) 130 combine and time-synchronize the reaction video and the original video (e.g., to form a synchronized video) in step 338, which can be performed in the same manner as step 220

In step 339, the recipient 114 is prompted to rate the original video. Additionally or alternatively, the recipient 114 can send a message to the creator 112 (e.g., using a text box). The recipient 114 is then prompted to send the rating and/or message to the creator 112 (e.g., via server(s) 130), such as by clicking on a send button.

After the recipient 114 sends the rating and/or message to the creator 112, the server(s) 130 check the privacy rules for the original video and/or the synchronized video, which were set in step 304. If the privacy rules indicate that the original video and/or the synchronized video were to be private to the recipient 114 and to the requestor 111 (i.e., step 340=no), the requestor 111 receives a new reaction video notification in step 345 (via placeholder E). If the privacy rules indicate that the original video and/or the synchronized video were to be shareable by the recipient 114 (i.e., step 340=yes), the requestor 111 is prompted in step 341 to select the shareability properties of the original video and/or the synchronized video and optional message. In an embodiment, the default shareability is set to view-only which allows the recipient 114 to send a shareable link 342A to others to view the original video and/or the reaction video. However, the recipient 114 may desire increased shareability options, which can be provided for additional fees. For example, the recipient 114 can request a downloadable file 342B of the original video and/or the synchronized video. In another example, the recipient 114 can request an NFT 342C of the original video and/or the synchronized video. If the recipient 114 selects a downloadable file 342B or NFT 342C, the recipient 114 may be required to pay additional fees in steps 343B, 343C, respectively. In steps 344A, B, and/or C, the appropriate link is created and sent to the recipient 114.

After the appropriate link is created in steps 344A-C, the requestor 111 receives a new reaction video notification in step 345 (via placeholder E). Step 345 is also reached after step 329 in which the original video and optional message were sent to the requestor 111 and recipient 114. When step 345 is reached after step 329, the requestor receives a new original video notification in step 345.

In step 346, the requestor 111 selects either the original video and/or the synchronized video to view (e.g., after logging into the application). Before the requestor 111 can review the original video and/or synchronized video, in step 347 the requestor 111 clicks on a facial authentication button to initiate facial authentication, which can be performed in the same manner as in steps 310, 322, and 332. If the requestor 111 passes facial authentication (i.e., step 348=yes), the method 30 proceeds to step 349. If the requestor 111 fails facial authentication (i.e., step 348=no), the method 30 returns to step 347 to allow the requestor 111 to initiate facial authentication again. In some embodiments, the system only allows the requestor 111 a maximum number of attempts for facial authentication after which the requestor's account is locked and/or the requestor 111 must wait a predetermined time period to attempt facial authentication another time. A notification can automatically be sent to the email address and/or phone number (e.g., text or voice call) in the requestor's profile to inform the requestor 111 of the failed facial authentication attempts.

After the requestor 111 has been facially authenticated, the requestor 111 reviews the original video and/or the synchronized video in step 349. In step 350, facial authentication and/or facial detection are performed while the requestor 111 views the original video and/or the synchronized video. If facial authentication or facial detection fails, playback of the original video and/or the synchronized video are paused or stopped in step 351 until facial authentication and/or facial detection are passed (or both facial authentication and facial detection are passed if both are implemented). The system continues to perform facial authentication and/or facial detection until the original video and/or the synchronized video are fully viewed. The requestor computing device 101 can pause the original video and/or the synchronized video or the requestor computing device 101 can send a signal to the server(s) 130 that indicates whether the requestor 111 passes or fails facial detection, and the server(s) 130 can cause the original video and/or the synchronized video to be paused and/or blurred based on the received signal.

In step 352, the requestor 111 is prompted to rate the original video and/or the synchronized video. Additionally or alternatively, the requestor 111 can send a message to the creator 112 and/or to the recipient 114 (e.g., using one or more text boxes). The recipient 114 is then prompted to send the rating and/or message(s) to the creator 112 and/or to the recipient 114 (e.g., via server(s) 130), such as by clicking on a send button.

After the recipient requestor 111 sends the rating and/or message to the creator 112 and/or to the recipient 114, the server(s) 130 check the privacy rules for the original video and/or the synchronized video, which were set in step 304. If the privacy rules indicate that the original video and/or the synchronized video were to be private to the recipient 114 and to the requestor 111 (i.e., step 353=no), the method 30 ends in step 354. If the privacy rules indicate that the original video and/or the synchronized video were to be shareable by the requestor 111 (i.e., step 353=yes), the requestor 111 is prompted in step 355 to select the shareability properties of the original video and/or the synchronized video and optional message. In an embodiment, the default shareability is set to view-only which allows the requestor 111 to send a shareable link 356A to others to view the original video and/or the reaction video. However, the requestor 111 may desire increased shareability options, which can be provided for additional fees. For example, the requestor 111 can request a downloadable file 356B of the original video and/or the synchronized video. In another example, the requestor 111 can request an NFT 356C of the original video and/or the synchronized video. If the requestor 111 selects a downloadable file 356B or NFT 356C, the requestor 111 may be required to pay additional fees in steps 357B, 357C, respectively. In steps 358A, B, and/or C, the appropriate link is created and sent to the requestor 111.

Figure 4:
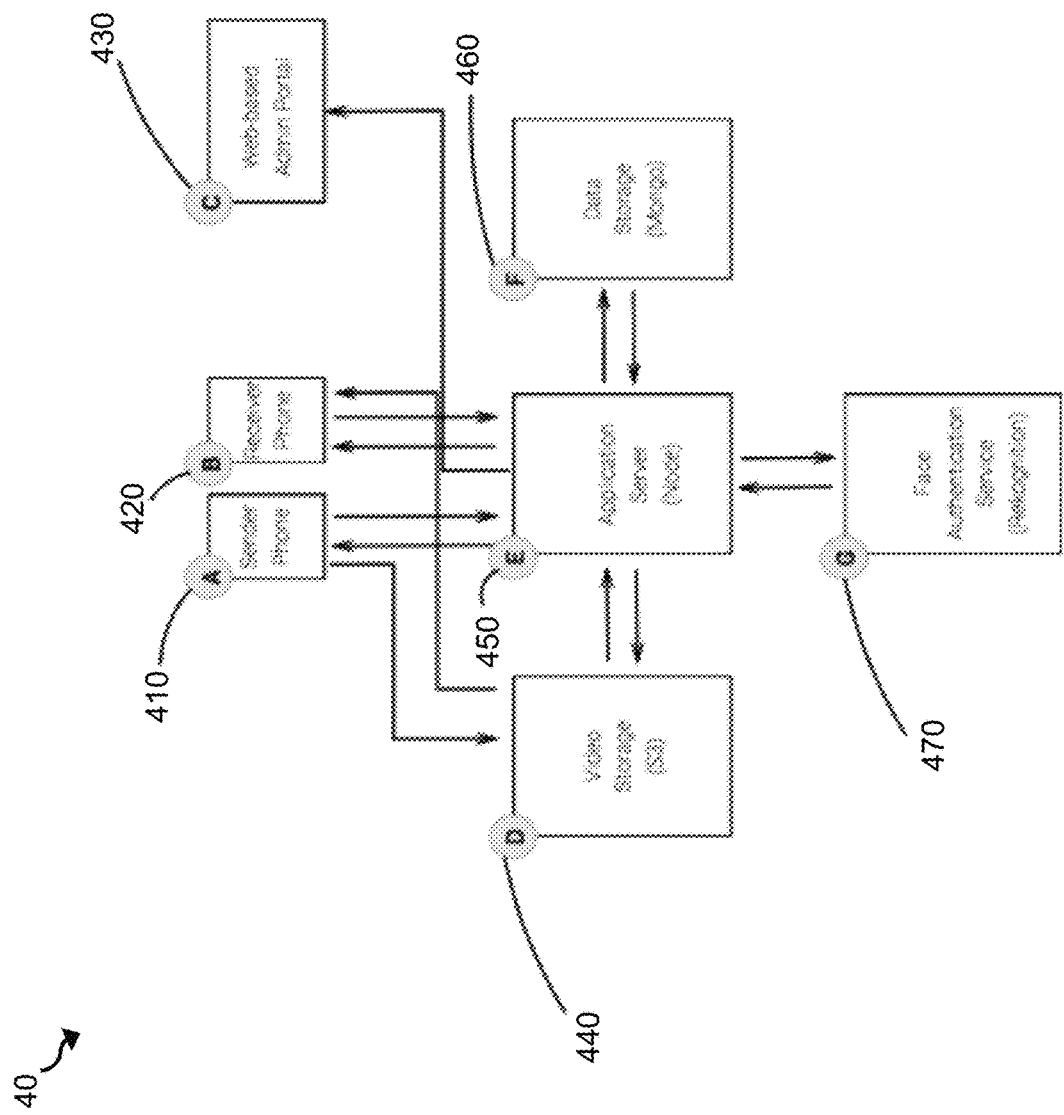
FIG. 4 is a schematic diagram illustrating a representative system architecture underlying the system and method disclosed herein according to some embodiments.

FIG. 4 illustrates an example system architecture 400 for the content sharing application disclosed herein. The components of such architecture 400 are described below.

Sender Phone Applications 410 and Receiver Phone Applications 420 are native applications on users' mobile devices (e.g., iOS and Android applications), such as computing devices 101-104, that present login, authentication, recipient selection, recipient validation, recording, reviewing response and other views. Such applications 410, 420 manage face detection to ensure that the respective viewer's face is centered on the front-facing camera, is close enough to the camera, and stays within those bounds during viewing. The applications 410, 420 call the face authentication application program interface (API) (through the back-end server 450) to authenticate the respective user's face (e.g., via face recognition server 470). The back-end server 450 can be the same as server(s) 130.

The web-based administration portal 430 is used by service managers to track usage, manage users, manage videos, and other administrative features.

The video storage server 440 stores users' videos and provides expiring links to the application server 450 based on authenticated user requests to view videos (both original and reaction videos). In some embodiments, the video storage server 440 comprises a third-party service such as Amazon Simple Storage Service (Amazon S3), which is object storage with a simple web service interface to store and retrieve any amount of data from anywhere on the web.

The application server 450 can be or can include a set of APIs, which may be node.js-based, to manage user authentication, sending and receiving videos, outbound notifications, admin features and access to the data storage server 460, as well as the rules around face authentication.

The data storage server 460 stores all user information and video metadata. The data storage server 460 may comprise a Mongo database or similar database. MongoDB is a free and open-source cross-platform document-oriented database program. Classified as a NoSQL database program, MongoDB uses JavaScript Object Notation (JSON)-like documents with schemas.

The face recognition server 470 can comprise a third-party service (e.g., Amazon's Rekognition service) that compares login and user photos provided by the application server 450 with real-time video of the user and responds with a percentage match.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor, but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A computer-implemented method for securely delivering content over a communications network, the method comprising:

receiving a request, from a requestor computing device associated with a requestor, for a creator to react to an original media content provided by the requestor, the request including one or more privacy conditions under which a third-party recipient and the requestor will be allowed to view a reaction to the original media content;

sending a notification of the request to a creator computing device associated with the creator;

receiving, from the creator computing device, an agreement to the privacy condition(s);

facially authenticating the creator's identity by:
receiving, from the creator computing device, real-time creator video data of the creator's face;
determining whether the creator's face in the real-time creator video data has at least a threshold facial recognition match to one or more pre-stored creator images that include the creator's face and/or one or more pre-stored creator videos that include the creator's face; and
determining that the creator's identity is authentic when the creator's face in the real-time creator video data has at least the threshold facial recognition match to the pre-stored creator image(s) and/or to the pre-stored creator video(s);

after facially authenticating the creator's identity, sending the request and the original media content to the creator computing device to allow the creator to review the request and the original media content;

after sending the request and the original media content to the creator computing device, receiving, from the creator computing device, an agreement to the request;

receiving, from the creator computing device, a reaction media content that represents the creator's reaction to the original media content;

combining the reaction media content and the original media content into a synchronized file in which the reaction media content is time-synchronized with the original media content;

sending, to the creator computing device, the synchronized file for review;

receiving, from the creator computing device, a creator's approval of the synchronized file;

after receiving the creator's approval of the synchronized file, automatically sending a notification to an approver computing device associated with an approver, the approver having a predetermined relationship with the creator, the notification indicating an availability of the synchronized file for review;

receiving, from the approver computing device, a request to review the synchronized file;

facially authenticating the approver's identity by:
receiving, from the approver computing device, real-time approver video data of the approver's face;
determining whether the approver's face in the real-time approver video data has at least the threshold facial recognition match to one or more pre-stored approver images that include the approver's face and/or one or more pre-stored approver videos that include the approver's face; and determining that the approver's identity is authentic when the approver's face in the real-time approver video data has at least the threshold facial recognition match to the pre-stored approver image(s) and/or to the pre-stored approver video(s);

after facially authenticating the approver's identity, sending the synchronized file to the approver computing device to allow the approver to review the synchronized file;

after sending the synchronized file to the approver computing device, receiving, from the approver computing device, an approver's approval of the synchronized file;

after receiving the approver's approval of the synchronized file, sending a notification to the requestor computing device, the notification indicating an availability of the synchronized file for review;

facially authenticating the requestor's identity by:
  receiving, from the requestor computing device, real-time requestor video data of the requestor's face;
  determining whether the requestor's face in the real-time requestor video data has at least the threshold facial recognition match to one or more pre-stored requestor images that include the requestor's face and/or one or more pre-stored requestor videos that include the requestor's face; and
  determining that the requestor's identity is authentic when the requestor's face in the real-time requestor video data has at least the threshold facial recognition match to the pre-stored requestor image(s) and/or to the pre-stored requestor video(s);

after facially authenticating the requestor's identity, sending the synchronized file to the requestor computing device to allow the requestor to review the synchronized file;

after sending the synchronized file to the requestor computing device, receiving, from the approver computing device, a creator's approval of the synchronized file;

after receiving the creator's approval of the synchronized file, sending a notification to a recipient computing device associated with the recipient, the notification indicating an availability of the synchronized file to view; and restricting a viewing of the synchronized file by the recipient to the privacy condition(s).

2. The method of claim 1, further comprising:
facially authenticating the recipient's identity by:
  receiving, from the recipient computing device, real-time recipient video data of the recipient's face;
  determining whether the recipient's face in the real-time creator video data has at least a threshold facial recognition match to one or more pre-stored creator images that include the recipient's face and/or one or more pre-stored creator videos that include the recipient's face; and
  determining that the recipient's identity is authentic when the recipient's face in the real-time creator video data has at least the threshold facial recognition match to the pre-stored creator image(s) and/or to the pre-stored creator video(s);

after facially authenticating the recipient's identity, sending the synchronized file to the recipient computing device to allow the requestor to view the synchronized file.

3. The method of claim 2, further comprising:
receiving real-time video images of the recipient's face while the recipient views the synchronized file;
performing facial recognition using the real-time video images of the recipient's face; and
when the facial recognition of the recipient fails, pausing a playback of the synchronized file.

4. The method of claim 2, further comprising when the facial recognition of the recipient fails, blurring the synchronized file.

5. The method of claim 1, wherein the original media content comprises an original video.

6. The method of claim 5, wherein the reaction media content comprises a reaction video.

7. The method of claim 1, further comprising receiving a rating of the synchronized file from the requestor and/or from the recipient.

8. The method of claim 1, wherein:
the privacy condition(s) include a shareability of the synchronized file by the requestor, and
the method further comprises when the privacy condition(s) allow the synchronized file to be shared by the requestor, prompting the requestor to select between (a) a shareable view-only link to the synchronized file, (b) a downloadable file of the synchronized file, and (c) a non-fungible token (NFT) for the synchronized file.

9. The method of claim 8, further comprising prompting the requestor for a payment when the requestor selects (b) or (c).

10. At least one server, each server comprising:
a microprocessor;
computer memory operatively coupled to the microprocessor, the computer memory including computer-readable instructions that when executed by the microprocessor cause the microprocessor to:
  receive a request, from a requestor computing device associated with a requestor, for a creator to react to an original media content provided by the requestor, the request including one or more privacy conditions under which a third-party recipient will be allowed to view the media content;
  send a notification of the request to a creator computing device associated with the creator;
  receive, from the creator computing device, an agreement to the privacy condition(s);
  facially authenticate the creator's identity by:
    receiving, from the creator computing device, real-time creator video data of the creator's face;
    determining whether the creator's face in the real-time creator video data has at least a threshold facial recognition match to one or more pre-stored creator images that include the creator's face and/or one or more pre-stored creator videos that include the creator's face; and
    determining that the creator's identity is authentic when the creator's face in the real-time creator video data has at least the threshold facial recognition match to the pre-stored creator image(s) and/or to the pre-stored creator video(s);
  after facially authenticating the creator's identity, send the request and the original media content to the creator computing device to allow the creator to review the request and the original media content;
  after sending the request and the original media content to the creator computing device, receive, from the creator computing device, an agreement to the request;

receive, from the creator computing device, a reaction media content that represents the creator's reaction to the original media content;
combine the reaction media content and the original media content into a synchronized file in which the reaction media content is time-synchronized with the original media content;
send, to the creator computing device, the synchronized file for review;
receive, from the creator computing device, a creator's approval of the synchronized file;
after receiving the approval of the synchronized file, automatically send a notification to an approver computing device associated with an approver, the approver having a predetermined relationship with the creator, the notification indicating an availability of the synchronized file for review;
receive, from the approver computing device, a request to review the synchronized file;
facially authenticate the approver's identity by:
  receiving, from the approver computing device, real-time approver video data of the approver's face;
  determining whether the approver's face in the real-time approver video data has at least the threshold facial recognition match to one or more pre-stored approver images that include the approver's face and/or one or more pre-stored approver videos that include the approver's face; and
  determining that the approver's identity is authentic when the approver's face in the real-time approver video data has at least the threshold facial recognition match to the pre-stored approver image(s) and/or to the pre-stored approver video(s);
after facially authenticating the approver's identity, send the synchronized file to the approver computing device to allow the approver to review the synchronized file;
after sending the synchronized file to the approver computing device, receive, from the approver computing device, an approver's approval of the synchronized file;
after receiving the approver's approval of the synchronized file, send a notification to the requestor computing device, the notification indicating an availability of the synchronized file for review;
authenticate the requestor's identity by:
  receiving, from the requestor computing device, real-time requestor video data of the requestor's face;
  determining whether the requestor's face in the real-time requestor video data has at least the threshold facial recognition match to one or more pre-stored requestor images that include the requestor's face and/or one or more pre-stored requestor videos that include the requestor's face; and
  determining that the requestor's identity is authentic when the requestor's face in the real-time requestor video data has at least the threshold facial recognition match to the pre-stored requestor image(s) and/or to the pre-stored requestor video(s);
after facially authenticating the requestor's identity, send the synchronized file to the requestor computing device to allow the requestor to review the synchronized file;
after sending the synchronized file to the requestor computing device, receive, from the approver computing device, a creator's approval of the synchronized file;
after receiving the creator's approval of the synchronized file, send a notification to a recipient computing device associated with the recipient, the notification indicating an availability of the synchronized file to view; and
restrict a viewing of the synchronized file by the recipient to the privacy condition(s).

11. A computer-implemented method for securely delivering content over a communications network, the method comprising:
receiving a request, from a requestor computing device associated with a requestor, for a creator to create an original video, the request including one or more privacy conditions under which a third-party recipient and the requestor will be allowed to view the original video;
sending a notification of the request to a creator computing device associated with the creator;
receiving, from the creator computing device, an agreement to the privacy condition(s);
facially authenticating the creator's identity by:
  receiving, from the creator computing device, real-time creator video data of the creator's face;
  determining whether the creator's face in the real-time creator video data has at least a threshold facial recognition match to one or more pre-stored creator images that include the creator's face and/or one or more pre-stored creator videos that include the creator's face; and
  determining that the creator's identity is authentic when the creator's face in the real-time creator video data has at least the threshold facial recognition match to the pre-stored creator image(s) and/or to the pre-stored creator video(s);
after facially authenticating the creator's identity, sending the request to the creator computing device to allow the creator to review the request;
after sending the request to the creator computing device, receiving, from the creator computing device, an agreement to the request;
receiving the original video;
sending, to the creator computing device, the original video for review;
receiving, from the creator computing device, a creator's approval of the original video;
after receiving the creator's approval of the original video, automatically sending a notification to an approver computing device associated with an approver, the approver having a predetermined relationship with the creator, the notification indicating an availability of the original video for review;
receiving, from the approver computing device, a request to review the original video;
facially authenticating the approver's identity by:
  receiving, from the approver computing device, real-time approver video data of the approver's face;
  determining whether the approver's face in the real-time approver video data has at least the threshold facial recognition match to one or more pre-stored approver images that include the approver's face and/or one or more pre-stored approver videos that include the approver's face; and
  determining that the approver's identity is authentic when the approver's face in the real-time approver video data has at least the threshold facial recognition match to the pre-stored approver image(s) and/or to the pre-stored approver video(s);

after facially authenticating the approver's identity, sending the original video to the approver computing device to allow the approver to review the original video;

after sending the original video to the approver computing device, receiving, from the approver computing device, an approver's approval of the original video;

after receiving the approver's approval of the original video, sending a notification to a recipient computing device associated with the recipient, the notification indicating an availability of the original video for viewing;

facially authenticating the recipient's identity by:
  receiving, from the recipient computing device, real-time recipient video data of the recipient's face;
  determining whether the recipient's face in the real-time recipient video data has at least the threshold facial recognition match to one or more pre-stored recipient images that include the recipient's face and/or one or more pre-stored recipient videos that include the recipient's face; and
  determining that the recipient's identity is authentic when the recipient's face in the real-time recipient video data has at least the threshold facial recognition match to the pre-stored recipient image(s) and/or to the pre-stored recipient video(s);

after facially authenticating the recipient's identity, sending the original video to the recipient computing device to allow the recipient to view the original video;

receiving a reaction video, from the recipient computing device, of the recipient viewing the original video;

combining the reaction video and the original video into a synchronized video in which the reaction video is time-synchronized with the original video;

sending a notification to the requestor computing device, the notification indicating an availability of the synchronized video to view;

facially authenticating the requestor's identity; and after facially authenticating the requestor's identity, sending the original video and the synchronized video to the requestor computing device to allow the requestor to view the original video and the synchronized video.

12. The method of claim 11, further comprising:
receiving real-time video images of the recipient's face while the recipient views the original video;
performing facial recognition using the real-time video images of the recipient's face; and
when the facial recognition of the recipient fails, pausing a playback of the original video.

13. The method of claim 12, further comprising when the facial recognition of the recipient fails, blurring the original video.

14. The method of claim 12, wherein the reaction video comprises the real-time video images of the recipient's face.

15. The method of claim 11, further comprising receiving a rating of the original video from the requestor and/or from the recipient.

16. The method of claim 11, further comprising restricting a viewing of the original video and/or of the reaction video based on the privacy condition(s).

17. The method of claim 16, wherein:
the privacy condition(s) include a shareability of the original video and the reaction video by the recipient, and
the method further comprises when the privacy conditions allow the original video and the reaction video to be shared by the recipient, prompting the recipient to select between (a) a shareable view-only link to the original video and/or the synchronized video, (b) a downloadable file of the original video and/or the synchronized video, and (c) a non-fungible token (NFT) for the original video and/or the synchronized video.

18. The method of claim 17, further comprising prompting the recipient for a payment when the recipient selects (b) or (c).

19. The method of claim 11, wherein:
the privacy condition(s) include a shareability of the original video and the reaction video by the requestor, and
the method further comprises when the privacy conditions allow the original video and the reaction video to be shared by the requestor, prompting the requestor to select between (a) a shareable view-only link to the original video and/or the synchronized video, (b) a downloadable file of the original video and/or the synchronized video, and (c) a non-fungible token (NFT) for the original video and/or the synchronized video.

20. The method of claim 19, further comprising prompting the requestor for a payment when the recipient selects (b) or (c).

21. The method of claim 1, wherein the approver is a talent/sports agent for the creator.

22. The method of claim 1, wherein the approver is an attorney for the creator.

23. The method of claim 1, wherein the approver is a member of the creator's family.

24. The at least one server of claim 10, wherein the approver is a talent/sports agent for the creator.

25. The at least one server of claim 10, wherein the approver is an attorney for the creator.

26. The at least one server of claim 10, wherein the approver is a member of the creator's family.

* * * * *